US012497987B1

United States Patent
Arnett et al.

(10) Patent No.: US 12,497,987 B1
(45) Date of Patent: Dec. 16, 2025

(54) CARTRIDGE MECHANISM AND METHOD FOR MONITORING A CLAMPING FORCE EXERTED ON A STRUCTURE BY A FASTENER DURING INSTALLATION

(71) Applicant: The Boeing Company, Arlington, VA (US)

(72) Inventors: Shawn M. Arnett, Auburn, WA (US); Jeremy W. Sibley, Auburn, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/173,774

(22) Filed: Apr. 8, 2025

(51) Int. Cl.
  *F16B 19/10* (2006.01)
  *B25B 31/00* (2006.01)

(52) U.S. Cl.
  CPC .......... *F16B 19/109* (2013.01); *B25B 31/005* (2013.01); *F16B 2200/95* (2023.08)

(58) Field of Classification Search
  CPC ... F16B 19/109; B25B 31/005; Y10T 29/4978
  See application file for complete search history.

(56) References Cited

U.S. PATENT DOCUMENTS

| | | | | |
|---|---|---|---|---|
| 4,399,685 | A * | 8/1983 | Atkey | G01L 1/042 73/11.01 |
| 4,787,274 | A * | 11/1988 | Belanger | B25B 31/005 81/59.1 |
| 4,892,449 | A * | 1/1990 | Croxton | B25B 31/005 269/48.3 |
| 4,934,884 | A * | 6/1990 | Rooke | H05K 7/1412 411/383 |
| 5,240,361 | A * | 8/1993 | Armstrong | F16B 19/109 269/48.2 |
| 7,070,375 | B2 * | 7/2006 | Hoeckelman | F16B 19/109 269/48.2 |
| 7,596,846 | B2 * | 10/2009 | Hoeckelman | F16B 19/109 33/774 |

(Continued)

OTHER PUBLICATIONS

Monogram Aerospace Fasteners, "Wedgelock Temporary Fastening Systems and Drilling Aids," available at <https://trsaero.com/monogramaerospace/wp-content/uploads/sites/3/2018/05/MAF_Wedgelock_Catalog.pdf>, retrieved on Feb. 19, 2025.

*Primary Examiner* — Michael W Hotchkiss

(57) ABSTRACT

A cartridge mechanism for monitoring a clamping force of a temporary fastener includes an inner assembly, an outer assembly, and a displacement indicating system. The inner assembly has an inner cap and an inner spring. The outer assembly has an outer cap and an outer spring. The displacement indicating system indicates an amount of compressive displacement of the inner and outer springs that represents attainment of a preliminary clamping force exerted on the structure by the temporary fastener. The inner spring is uncalibrated and has a spring constant substantially equal to that of the outer spring, which is calibrated to one-half the preliminary clamping force at the amount of compressive displacement indicated by the displacement indicating system. The outer assembly is removable from the inner assembly to result in a final clamping force exerted by the temporary fastener on the structure of approximately one-half the preliminary clamping force.

20 Claims, 25 Drawing Sheets

(56) References Cited

U.S. PATENT DOCUMENTS

| | | | | |
|---|---|---|---|---|
| 8,033,003 | B2* | 10/2011 | Scheinberger | B25B 31/005 29/523 |
| 9,895,750 | B2* | 2/2018 | Craig | B23B 49/026 |
| 10,982,701 | B2* | 4/2021 | McClure | F16B 19/109 |
| 12,258,986 | B2* | 3/2025 | Brachet | B23P 19/04 |
| 2006/0083599 | A1* | 4/2006 | Hoeckelman | F16B 19/109 411/54 |
| 2008/0044252 | A1* | 2/2008 | Scheinberger | F16B 19/109 411/34 |
| 2017/0307002 | A1* | 10/2017 | McClure | F16B 19/109 |
| 2018/0021860 | A1* | 1/2018 | Craig | F16B 19/109 408/103 |
| 2022/0136549 | A1* | 5/2022 | McClure | F16B 19/109 411/75 |

\* cited by examiner

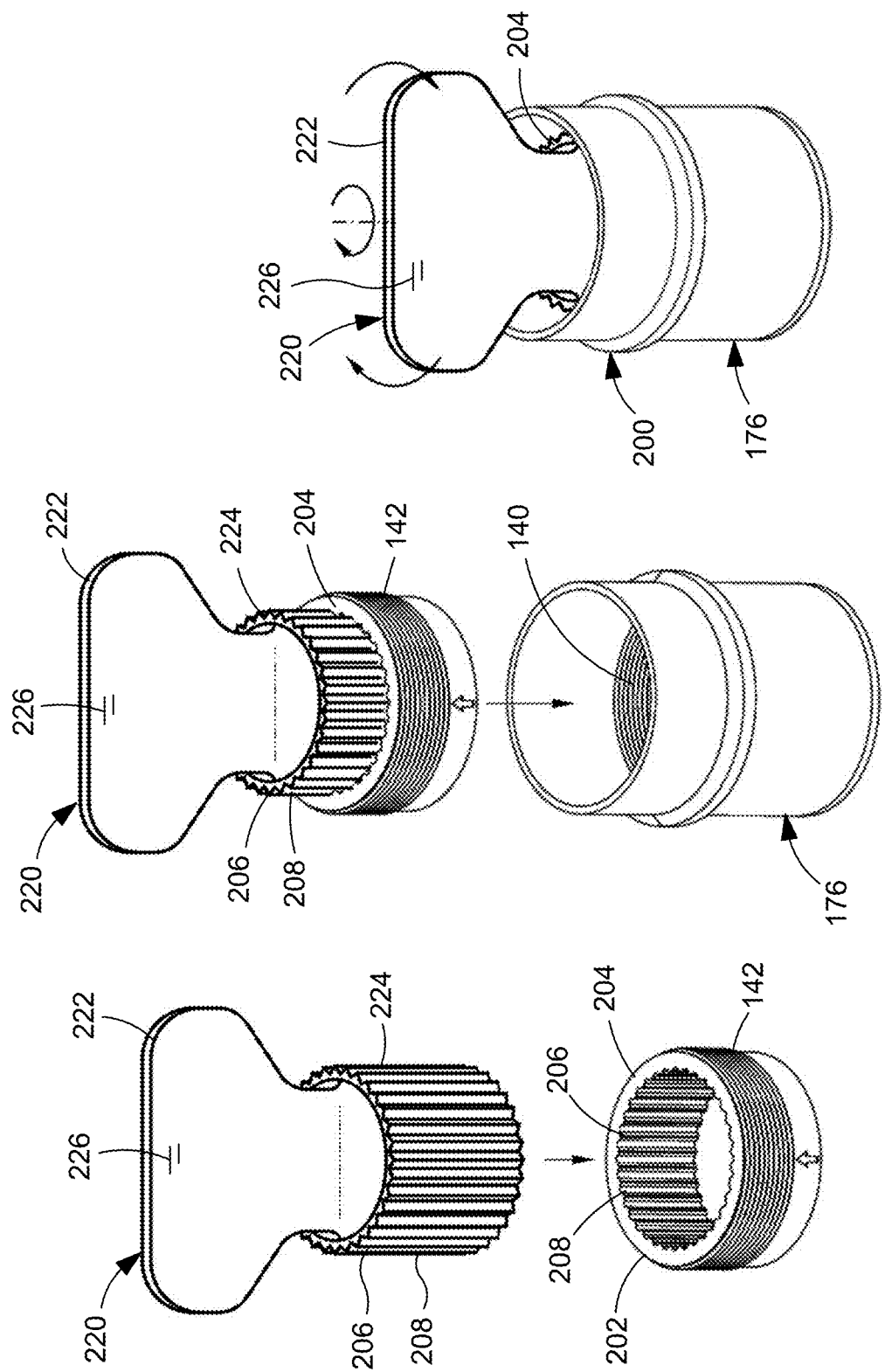

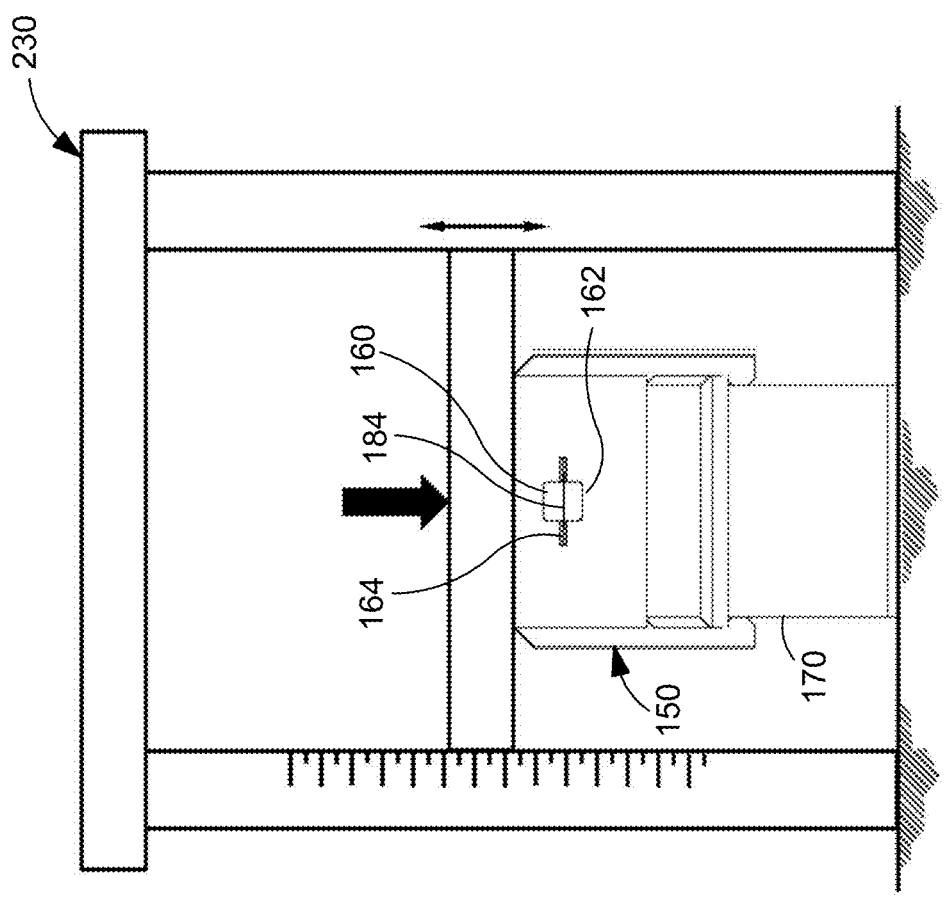

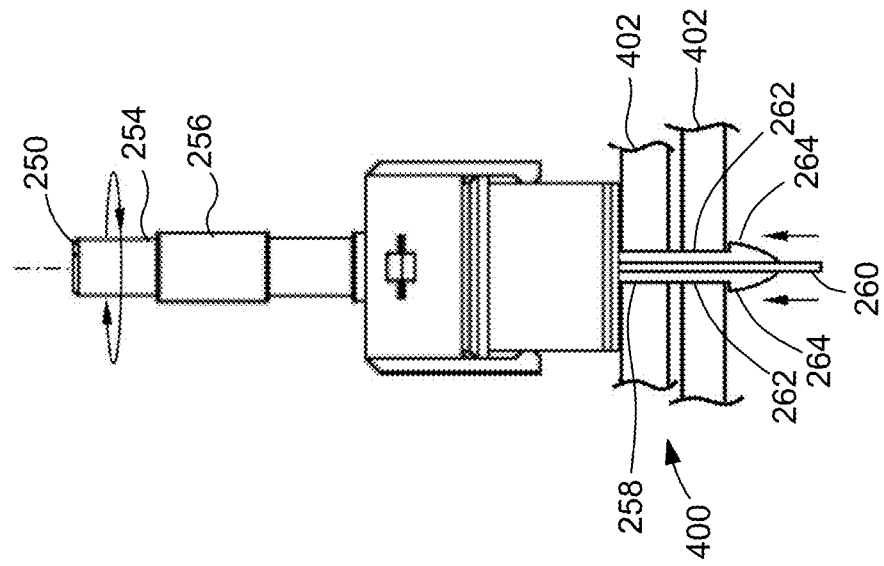
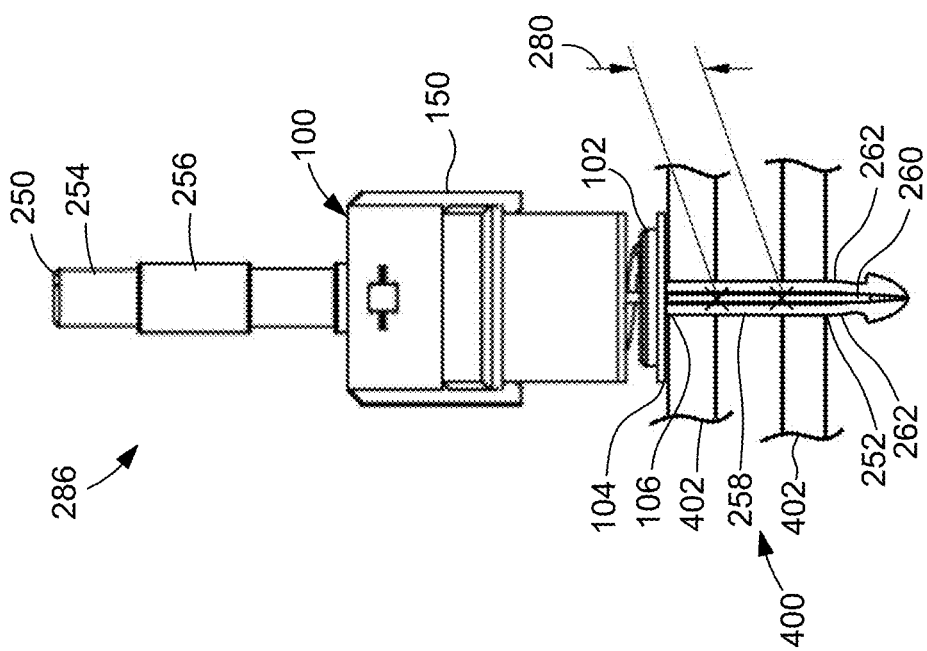

CARTRIDGE MECHANISM AND METHOD FOR MONITORING A CLAMPING FORCE EXERTED ON A STRUCTURE BY A FASTENER DURING INSTALLATION

FIELD

The present disclosure relates generally to fastener installations and, more particularly, to a system and method for monitoring the clamping force exerted on a structure by a temporary fastener during installation.

BACKGROUND

During the assembly of a structure, temporary fasteners can be used to clamp the structural components together prior to installing permanent fasteners. For example, in aircraft manufacturing, reusable temporary fasteners such as Clecos™ are commonly used to clamp together the structural components of the aircraft structure, such as a wing or fuselage. Each Cleco™ has a pin assembly comprising a pair of axially movable prongs located on opposite sides of a splay pin. The pin assembly is inserted into a fastener hole in the structure, and clamping pressure is applied by tightening the Cleco™, which draws the prongs against the backside of the structure.

The clamping pressure applied by each Cleco™ must be precisely controlled to avoid over-stressing the structural components. At the same time, the clamping pressure must be sufficient to position the structural components in a nominal state to allow for measurement of gaps that may occur at one or more fastener locations. Gaps that fall within allowable limits are typically filled by shims, which are separately manufactured and permanently installed with the structure during the installation of permanent fasteners.

Conventional methods for monitoring the clamping pressure of temporary fasteners rely on multiple devices, each having a calibrated spring. Each temporary fastener must be mounted to such a device prior to installation in a fastener hole. Large commercial aircraft can require thousands of these devices during the assembly of a single aircraft structure. Because each spring must be individually calibrated, the cumulative cost of such devices adds significantly to the overall cost of the program.

As can be seen, there exists a need in the art for a system and method for monitoring the clamping pressure exerted by temporary fasteners on a structure that avoids the above-noted drawbacks associated with conventional methods.

SUMMARY

The above-noted needs associated with monitoring the clamping pressure of temporary fasteners are addressed by the present disclosure, which provides a cartridge mechanism for monitoring a clamping force exerted on a structure during installation of a temporary fastener. The cartridge mechanism includes an inner assembly, an outer assembly, and a displacement indicating system. The inner assembly has an inner cap configured to receive a temporary fastener having a protruding pin assembly configured to be inserted into a fastener hole in a structure. In addition, the inner assembly has an inner spring positionable between the inner cap and the structure. The outer assembly has an outer cap removably couplable to the inner cap. In addition, the outer assembly has an outer spring positionable between the outer cap and the structure and encircling the inner spring. The displacement indicating system is integrated into the outer assembly and is configured to indicate an amount of compressive displacement of the inner spring and outer spring that represents attainment of a desired preliminary clamping force exerted on the structure due to tightening of the temporary fastener. The inner spring is uncalibrated and has a spring constant substantially equal to that of the outer spring, which is calibrated to one-half the preliminary clamping force at the amount of compressive displacement indicated by the displacement indicating system. The outer assembly is removable from the inner assembly to result in a final clamping force exerted by the temporary fastener on the structure of approximately one-half the preliminary clamping force.

Also disclosed is an interim manufacturing assembly comprising a structure containing a plurality of fastener holes, a plurality of temporary fasteners installed in the fastener holes, and a plurality of inner assemblies upon which the plurality of temporary fasteners are respectively mounted. Each inner assembly is configured to be temporarily coupled to a reusable outer assembly of a cartridge mechanism during fastener installation. The inner assembly at each temporary fastener includes an inner cap on which the temporary fastener is mounted. In addition, the inner assembly includes an inner spring located between the inner cap and the structure. The outer assembly includes an outer cap removably couplable to the inner cap of each inner assembly. In addition, the outer assembly includes an outer spring located between the outer cap and the structure when the outer assembly is coupled to one of the inner assemblies. The cartridge mechanism includes a displacement indicating system configured to indicate an amount of compressive displacement of the inner spring and outer spring that represents attainment of a desired preliminary clamping force exerted on the structure at each fastener hole due to tightening of the temporary fastener. The inner spring of each inner assembly is uncalibrated and has a spring constant substantially equal to that of the outer spring, which is calibrated to one-half the preliminary clamping force at the amount of compressive displacement indicated by the displacement indicating system. The outer assembly of the cartridge mechanism is removable from each inner assembly and is reusable on other inner assemblies in a manner resulting in a final clamping force at each temporary fastener of approximately one-half the preliminary clamping force.

Also disclosed is a method of monitoring a clamping force exerted on a structure during installation of a temporary fastener. The method includes providing a cartridge mechanism, comprising an inner assembly having an inner cap and an inner spring positionable between the inner cap and the structure. In addition, the cartridge mechanism includes an outer assembly having an outer cap removably coupled to the inner cap. In addition, the outer assembly includes an outer spring positionable between the outer cap and the structure and encircling the inner spring. The cartridge mechanism further includes a displacement indicating system integrated into the outer assembly. The inner spring is uncalibrated and has a spring constant substantially equal to that of the outer spring, which is calibrated to one-half of a desired preliminary clamping force exerted on the structure at a compressive displacement indicated by the displacement indicating system. The method includes mounting a temporary fastener on the inner cap to form a fastener-cartridge assembly. In addition, the method includes positioning the fastener-cartridge assembly against the structure in a manner such that a pin assembly protruding from the temporary fastener extends into a fastener hole in the structure. Furthermore, the method includes tightening the temporary fastener until the displacement indicating system indicates that the inner spring and outer spring haven been equally compressed by an amount representing attainment of a predetermined preliminary clamping force on the structure. The method also includes removing the outer assembly from the inner assembly to result in fastener-inner assembly providing a final clamping force exerted on the structure by the temporary fastener of approximately one-half the preliminary clamping force.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 13 is a perspective view of an example of a thumbscrew for installing the spring setter in the outer body;

FIG. 14 shows the spring setter engaged to the thumbscrew prior to installation in the outer body;

FIG. 15 shows the use of the thumbscrew to rotate the spring setter as a means to adjust its axial position within the outer body;

FIG. 16 shows an example of a calibration machine (e.g., a load cell or stress-strain machine) as may be used for adjusting the preload on the outer spring during calibration prior to and/or during use of the cartridge mechanism for installing a plurality of temporary fasteners in a structure;

FIG. 42 shows the fastener-cartridge assembly of FIG. 41 positioned against the structure such that the pin assembly of the temporary fastener extends into a fastener hole;

FIG. 43 shows the tightening of the temporary fastener by rotating the fastener head until the displacement indicating system (e.g., the sight window) indicates (e.g., via visual observation) compression of the inner and outer springs by an amount representing attainment of a predetermined preliminary clamping force on the structure;

Figure 2:
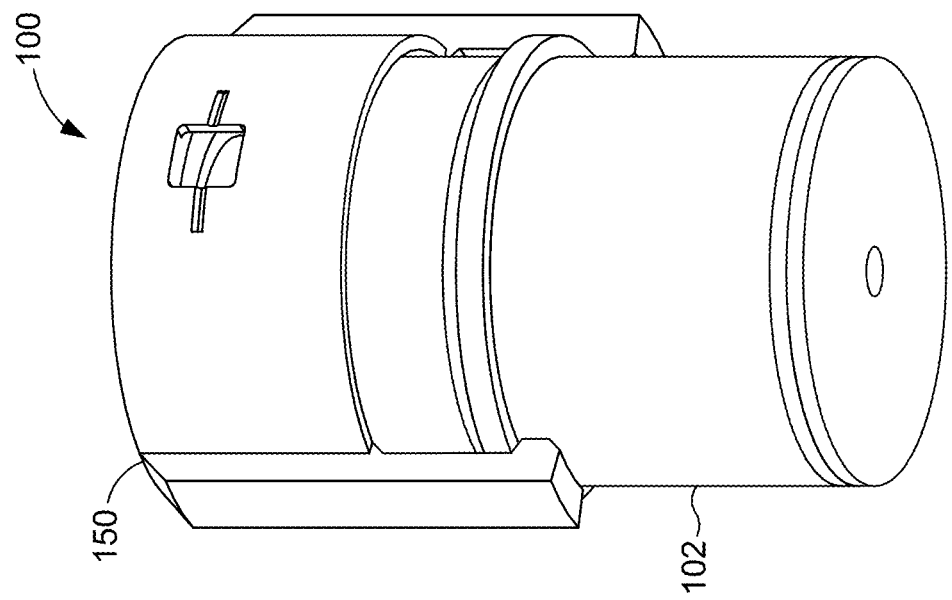
FIG. 2 is a bottom-up perspective view of the cartridge mechanism of FIG. 1.
Figure 1:
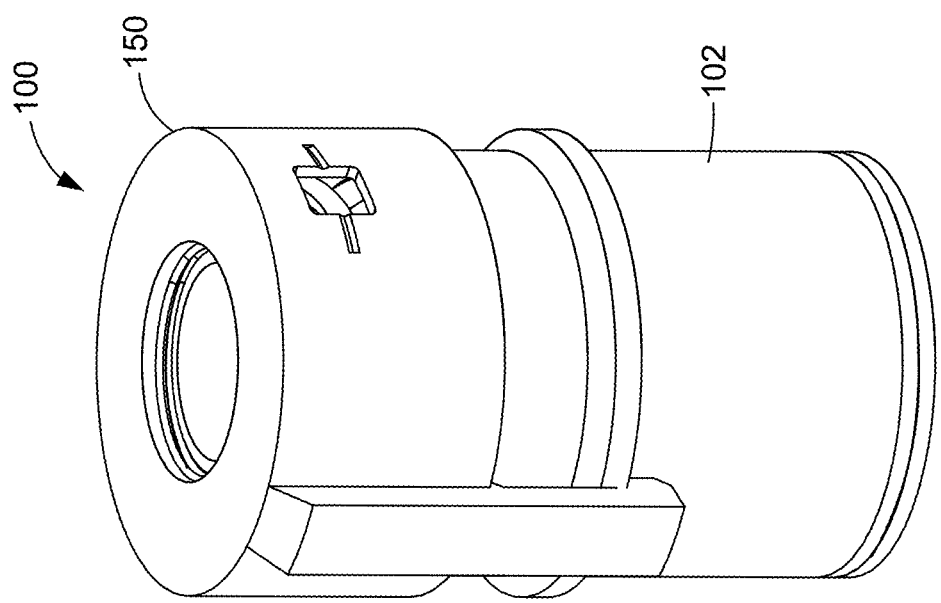
FIG. 1 is a top-down perspective view of an example of a cartridge mechanism, which includes an outer assembly and an inner assembly.
Figures 3, 4:
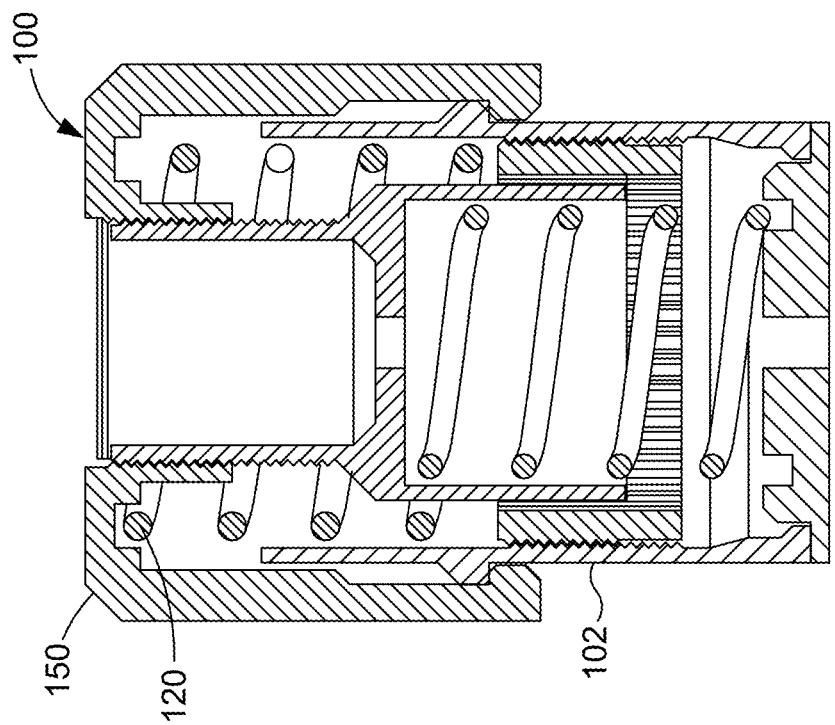
FIG. 3 is a side view of the cartridge mechanism of FIG. 1.
FIG. 4 is a sectional view of the cartridge mechanism of FIG. 1 showing the outer assembly comprising an outer spring captured between an outer cap and an outer body, and showing the inner assembly having an inner spring captured between an inner cap and a base plate.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one example," "an example," and "some examples." Instances of the phrases "one example," "an example," or "some examples" do not necessarily refer to the same example. Particular features, structure 400s 400, or characteristics may be combined in any suitable manner consistent with this disclosure.

As used herein, "comprising" is an open-ended term, and as used in the claims, this term does not foreclose additional structure 400s 400 or steps.

As used herein, "configured to" means various parts or components may be described or claimed as "configured to" perform a task or tasks. In such contexts, "configured to" is used to connote structure 400 by indicating that the parts or components include structure 400 that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps. As used herein, the term "and/of" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Referring now to the drawings which illustrate various examples of the disclosure, shown in FIGS. 1-4 is an example of a cartridge mechanism 100 for monitoring the change (e.g., increase) in clamping force exerted on a structure 400 (FIGS. 34-36) by a temporary fasteners 250 (FIG. 34) during installation. More specifically, the cartridge mechanism 100 provides a means for precisely controlling the clamping force applied to the structure 400 during tightening of the temporary fastener 250. By precisely controlling clamping pressure, over-stressing of the structure 400 is prevented. In this regard, monitoring clamping pressure provides a means for avoiding the risk of damaging the structure 400 due to excessive clamping force on composite layers, thin metallic layers, and/or relatively soft materials. Furthermore, the cartridge mechanism 100 allows for the precise application of an engineering-defined clamping pressure, as required for positioning two or more structural components 402 (FIGS. 34-36) in a nominal state to enable the measurement of gaps (FIG. 43) that may occur between the structural components 402 at each fastener location. Gaps that fall within allowable limits are typically filled with shims (not shown), which are separately manufactured and permanently installed during the installation of permanent fasteners. This approach allows the structure 400 to be assembled in its nominal (i.e., intended or as-designed) state using permanent fasteners, thereby reducing the risk of introducing manufacturing stresses into the structure 400.

Figure 33:
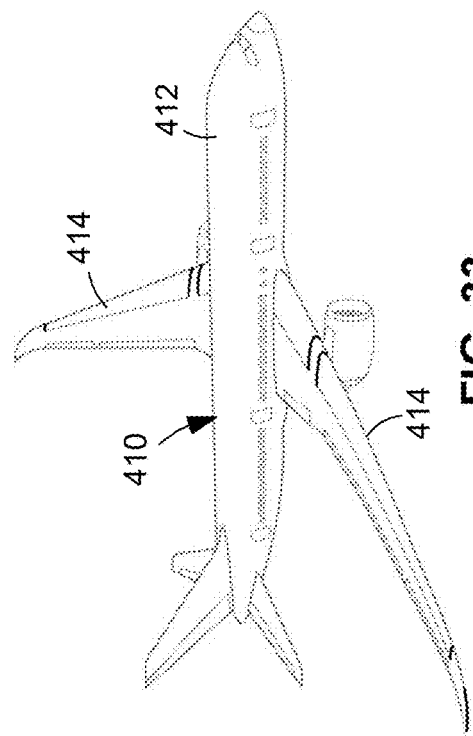
FIG. 33 shows an example of an aircraft.

Importantly, the presently disclosed cartridge mechanism 100 avoids the need for a calibrated spring at each fastener location as required by conventional methods. Instead, the cartridge mechanism 100 includes an outer assembly 150 containing a calibrated outer spring 170 (FIG. 4) that is reusable at each of a plurality of temporary fasteners 250 during their installation. By avoiding the need for a calibrated spring at each temporary fastener 250, the cartridge mechanism 100 provides significant cost savings for manufacturing programs that use large quantities of temporary fasteners 250, such as commercial aircraft programs which can require the installation of thousands of temporary fasteners 250 during the assembly of a single structure 400 such as a wing 414 (FIG. 33) or fuselage 412 (FIG. 33).

Figure 46:
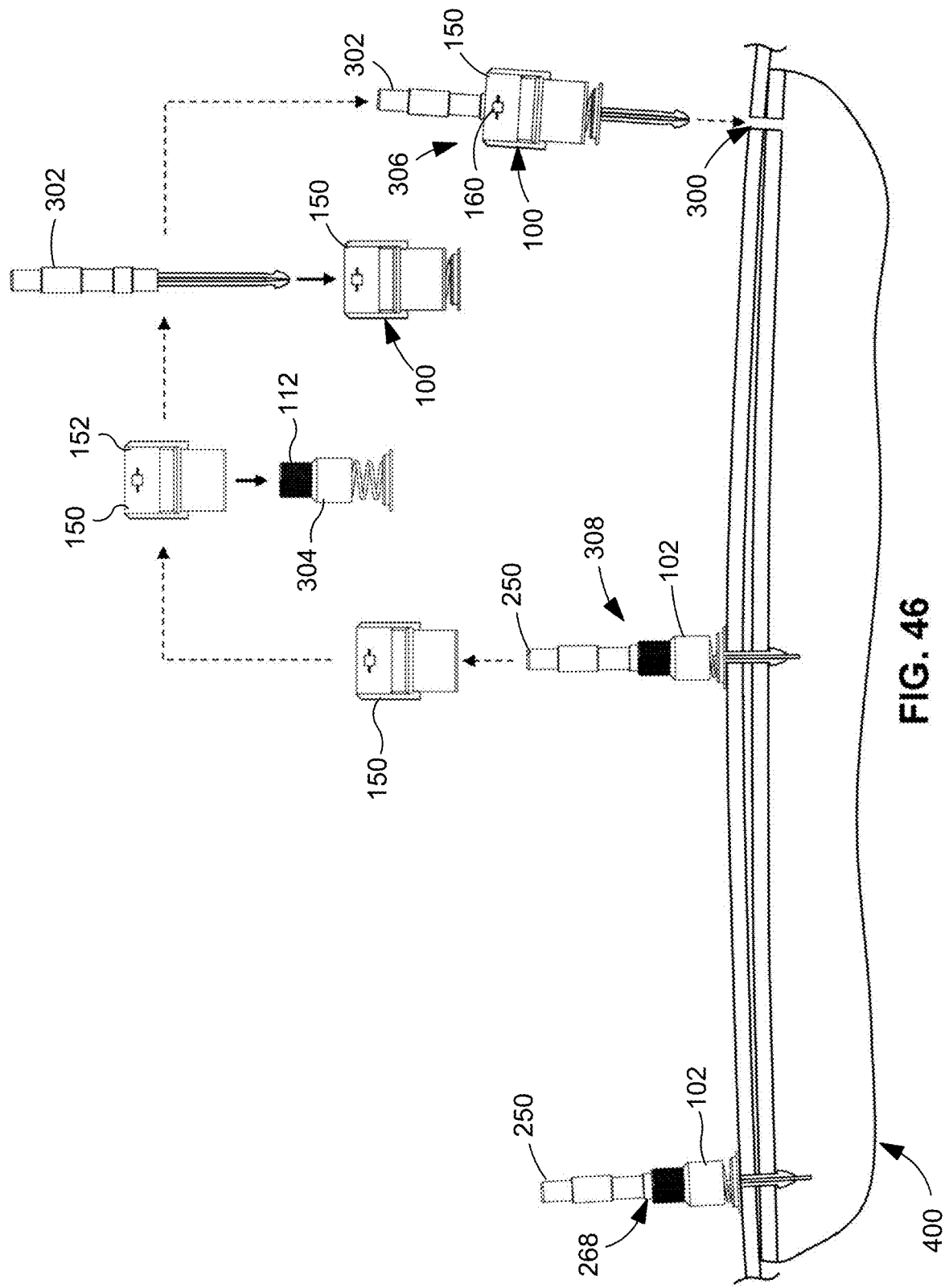
FIG. 46 shows the process of using the outer assembly of FIG. 45 to install a plurality of additional temporary fasteners in the structure.

Referring to FIGS. 1-10, the cartridge mechanism 100 includes an inner assembly 102 and an outer assembly 150. As described in greater detail below and shown in FIG. 46, the outer assembly 150 is removable from the inner assembly 102 to allow for re-use of the outer assembly 150 during the installation of other temporary fasteners 250, as illustrated in FIG. 46.

Figure 6:
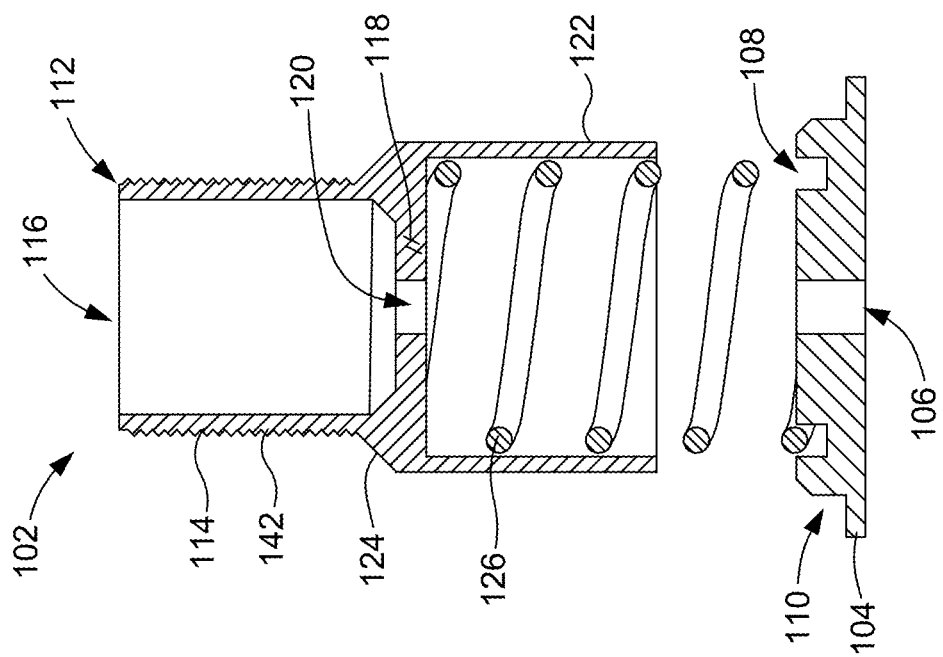
FIG. 6 is a sectional view of the inner assembly of FIG. 5.
Figure 5:
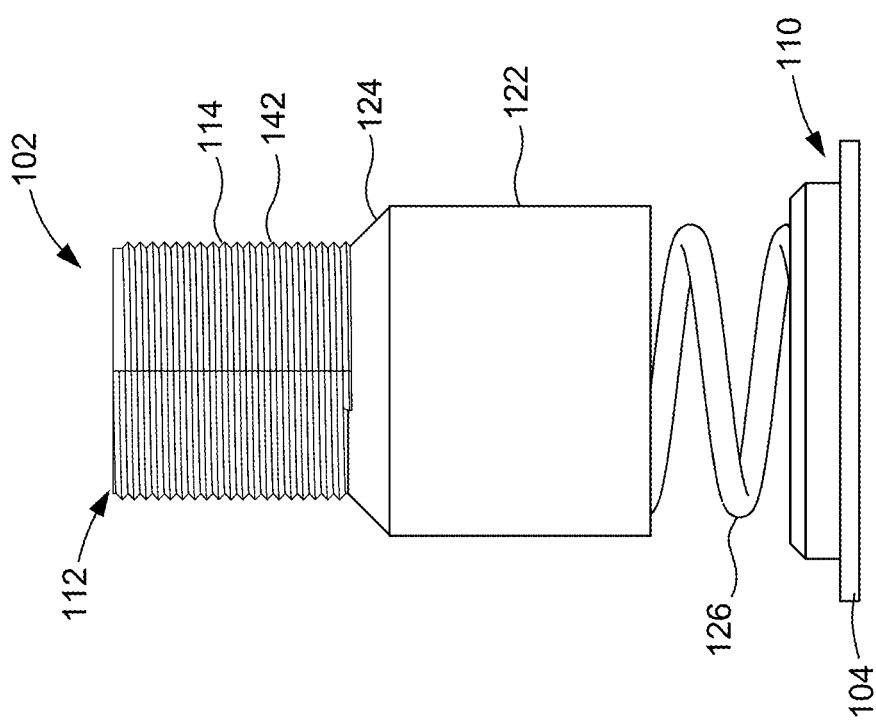
FIG. 5 is a side view of an example of the inner assembly.
Figure 7:
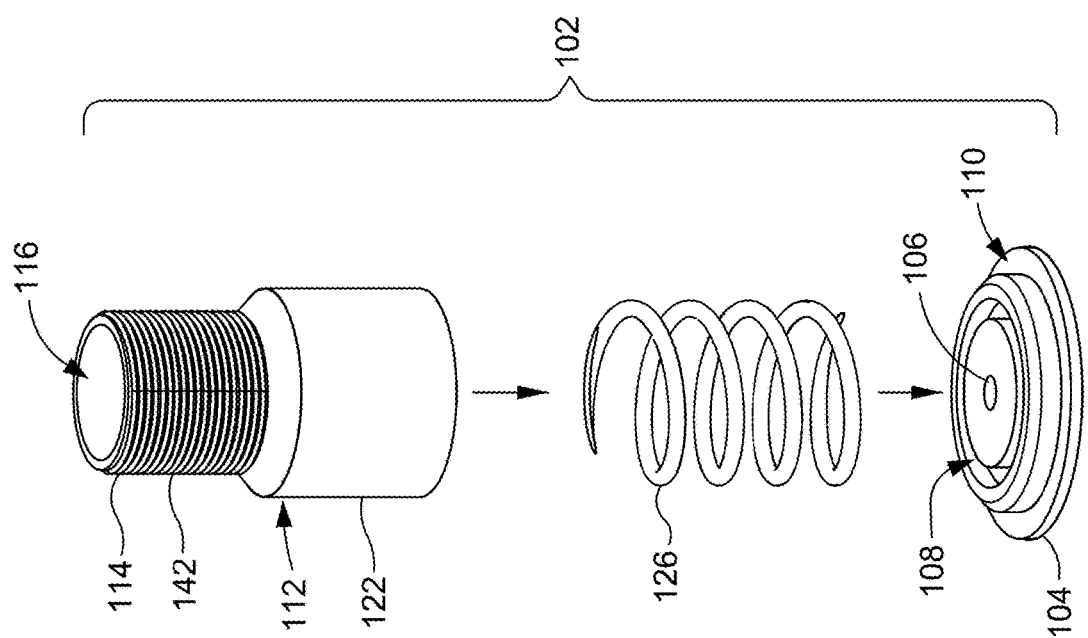
FIG. 7 is an exploded view of the inner assembly of FIG. 5.
Figure 19:
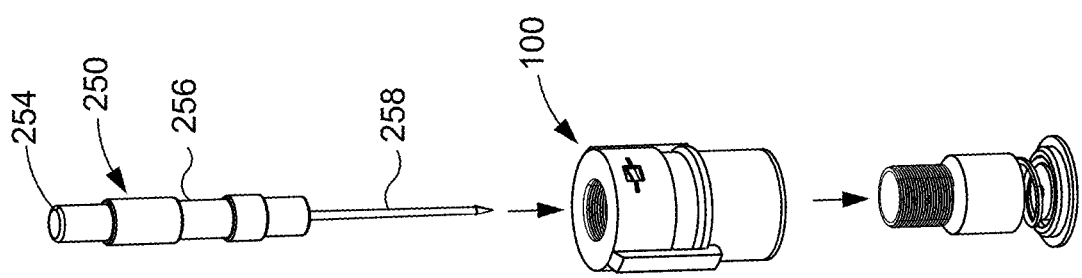
FIG. 19 is an exploded view of the cartridge mechanism and an example of a temporary fastener in the form of a Cleco™ having a pin assembly comprised of a stationary splay pin and a pair of prongs that axially slide along opposite sides of the splay pin.

Referring to FIGS. 5-7, the inner assembly 102 has an inner cap 112 and an inner spring 126. The inner spring 126 is positionable between the inner cap 112 and the structure 400. In the example shown, the inner assembly 102 includes a base plate 104 configured to be positioned against the structure 400, and the inner spring 126 is captured between the inner cap 112 and the base plate 104. The inner cap 112 is configured to receive a temporary fastener 250 (FIG. 19). The temporary fastener 250 has a pin assembly 258 (FIGS. 19-21) which passes through the cartridge mechanism 100 and extends into a fastener hole 252 (FIG. 24) formed in the structure 400 as shown in FIGS. 19-25 and described below. In the present disclosure, the temporary fastener 250 is a Cleco™ fastener. However, the cartridge mechanism 100 is capable of receiving temporary fasteners 250 of any one of a variety of alternative configurations, and is not limited to Cleco™ fasteners.

Referring still to FIGS. 5-7, shown is an example of the inner assembly 102 comprising the inner cap 112, the inner spring 126, and the base plate 104. The inner cap 112 has an inner cap upper portion 114 having external threads 142. In addition, the inner cap upper portion 114 has an inner cap bore 116 configured to receive the lower end of a temporary fastener 250. The inner cap bore 116 has a floor 118 containing an inner cap hole 120 configured to receive the pin assembly 258 protruding from the temporary fastener 250. As mentioned above, the pin assembly 258 is configured to be inserted into a fastener hole 252 (e.g., a pilot hole) from a frontside 404 (FIG. 24) of the structure 400. As described in greater detail below, the pin assembly 258 is configured to be drawn up against a backside 406 (FIGS. 25-29) of the structure 400 to apply clamping pressure.

The inner cap 112 has a cylindrical inner cap lower portion 122 configured to house the upper portion of the inner spring 126. The inner cap lower portion 122 is interconnected to the inner cap upper portion 114 by an inner cap intermediate portion 124. The inner cap intermediate portion 124 can include the floor 118 of the inner cap bore 116. In the example shown, the inner cap upper portion 114 has a smaller diameter than the inner cap lower portion 122. However, in other examples not shown, the diameter of the inner cap upper portion 114 can have the same or larger diameter than the inner cap lower portion 122.

Figure 9:
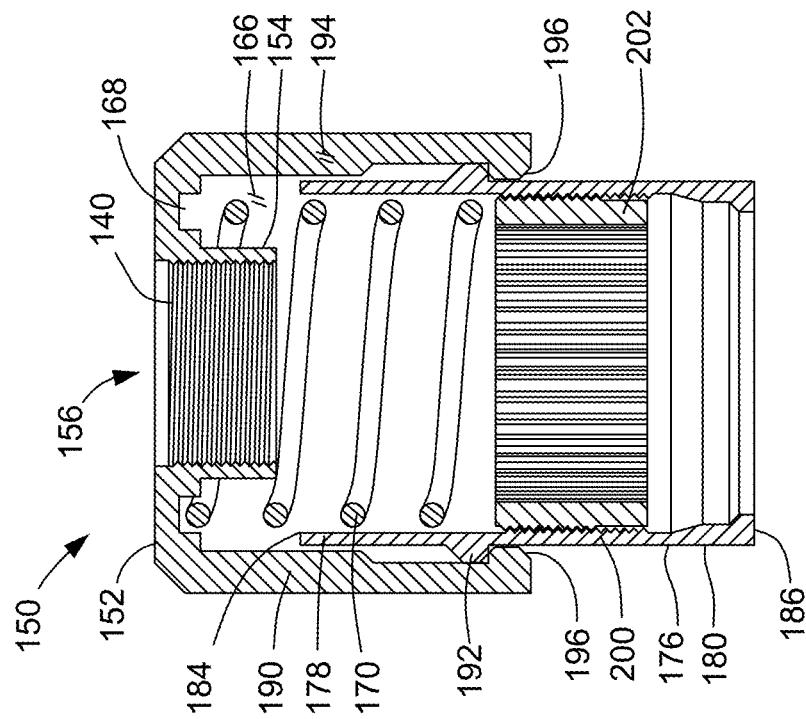
FIG. 9 is a sectional view of the outer assembly of FIG. 8.
Figure 8:
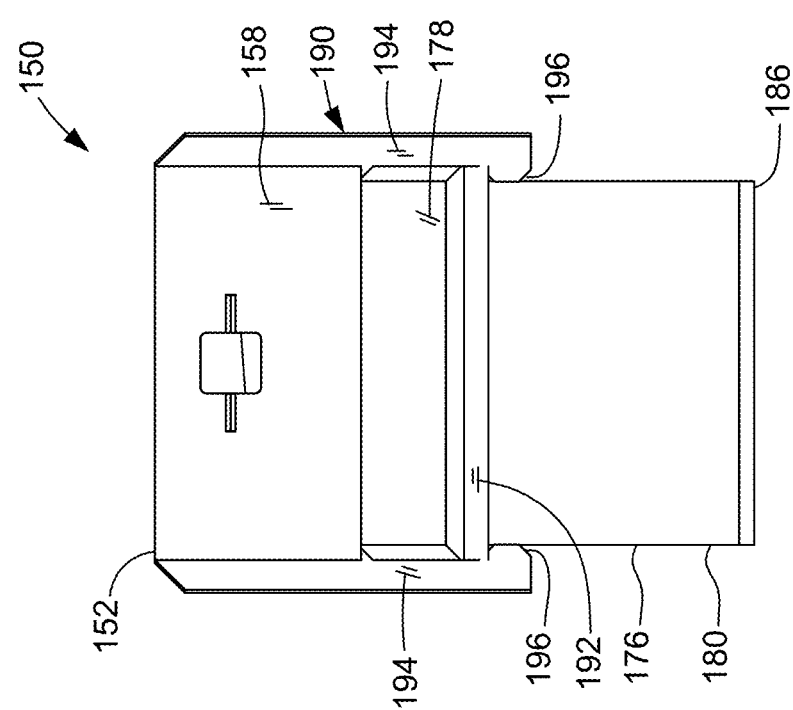
FIG. 8 is a side view of an example of the outer assembly.

In the example of FIGS. 5-7, the inner assembly 102 includes the above-mentioned base plate 104, which is configured to bear against the structure 400 during installation of a temporary fastener 250. The base plate 104 is configured to be placed in direct contact with the frontside 404 of the structure 400. The base plate 104 has a base plate notch 110 extending around the outer edge of the base plate 104. The base plate notch 110 is sized complementary to the outer body lower edge 186 (FIGS. 8-9) of the outer body 176 (FIGS. 8-9). The base plate 104 has a base plate hole 106 configured to receive the pin assembly 258 as it is inserted through the cartridge mechanism 100 and into a fastener hole 252.

The inner spring 126 is a coil spring that is preferably uncalibrated to reduce the costs associated with installing a plurality of temporary fasteners 250. However, in other examples of the cartridge mechanism 100, the inner spring 126 can be calibrated. As described in greater detail below, the uncalibrated inner spring 126 is designed and manufactured to have substantially the same (e.g., within 20%) spring constant as the outer spring 170, which can be achieved by selecting the appropriate combination of inner spring characteristics including, but not limited to, spring material, wire thickness (i.e., wire diameter), and coil diameter. The inner spring 126 is captured between the base plate 104 and the inner cap 112. In the example shown, the upper portion of the inner spring 126 is encircled by the inner cap lower portion 122. The base plate 104 can include a base plate groove 108 (FIGS. 6-7) configured to receive the lower end of the inner spring 126.

Figure 10:
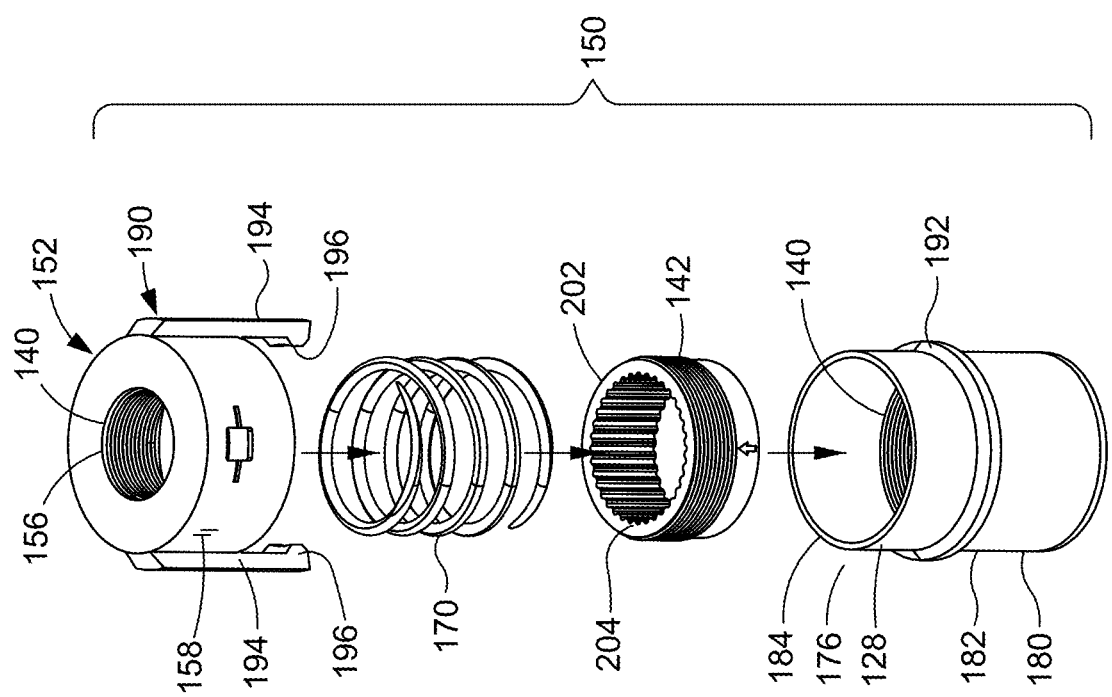
FIG. 10 is an exploded view of the outer assembly of FIG. 8.
Figure 12:
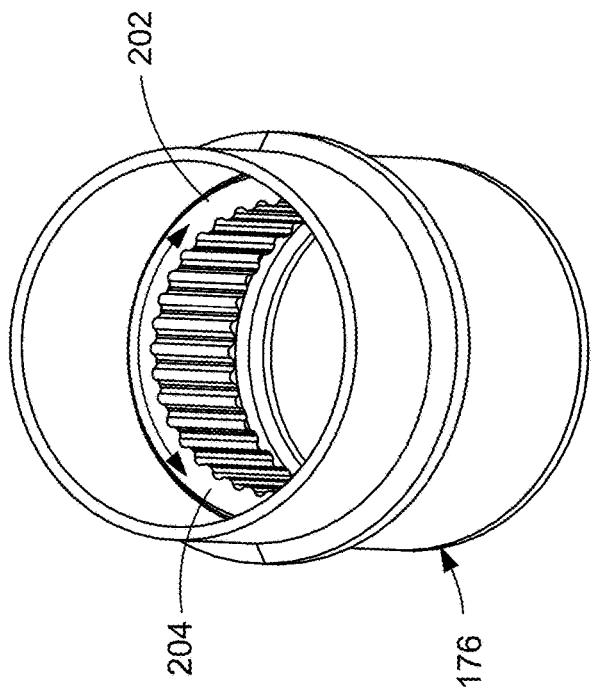
FIG. 12 is a perspective view of the outer body after installation of the spring setter.
Figure 11:
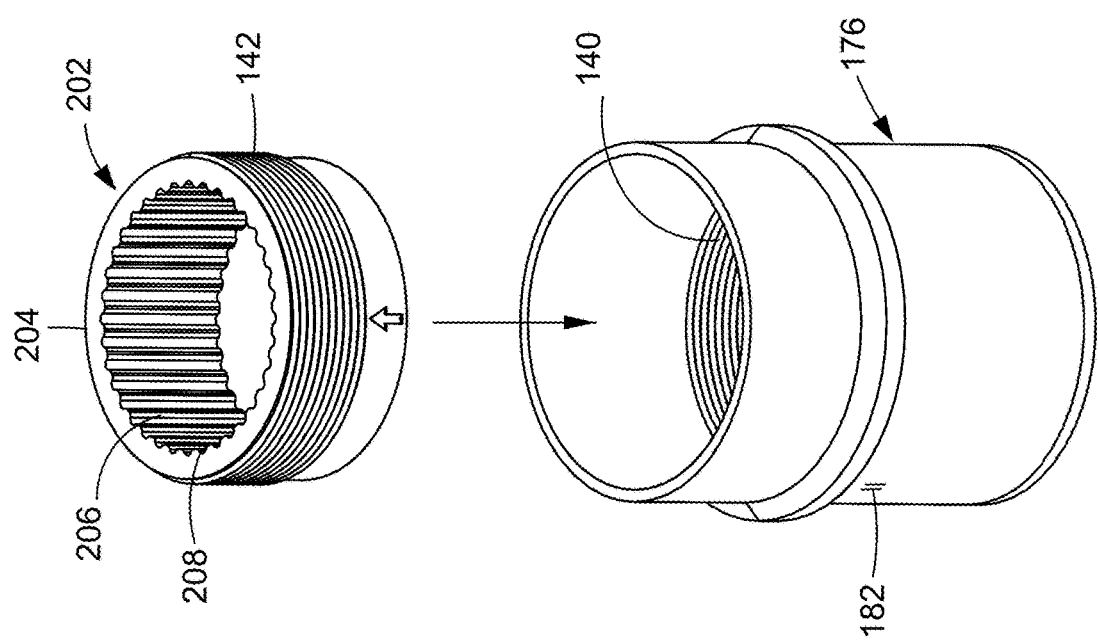
FIG. 11 is an exploded view of the outer body and a spring setter configured to be installed in the outer body.
Figure 18:
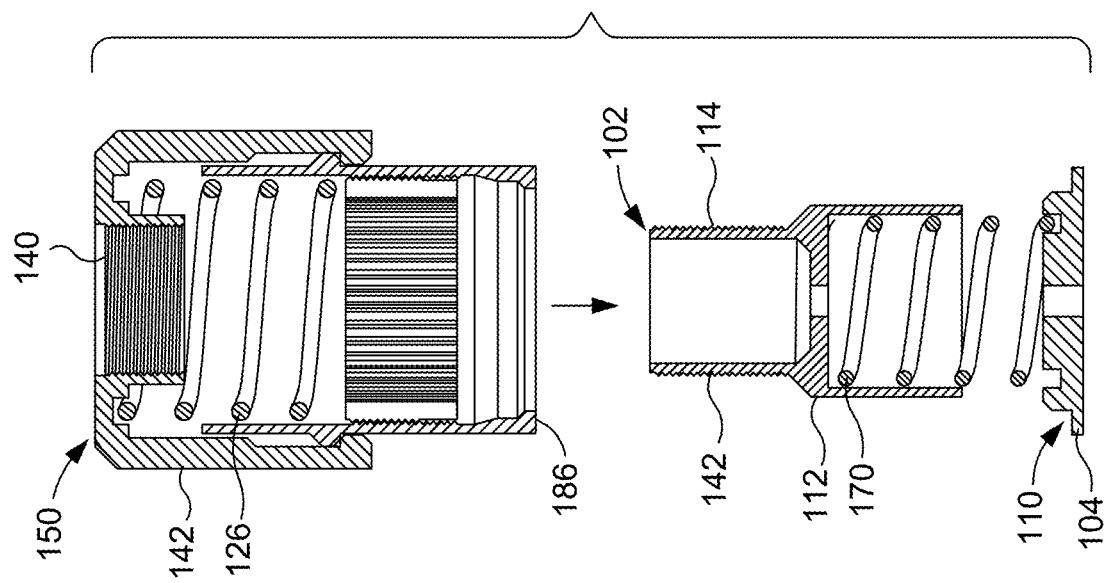
FIG. 18 is a sectional view of the cartridge mechanism of FIG. 17.
Figure 17:
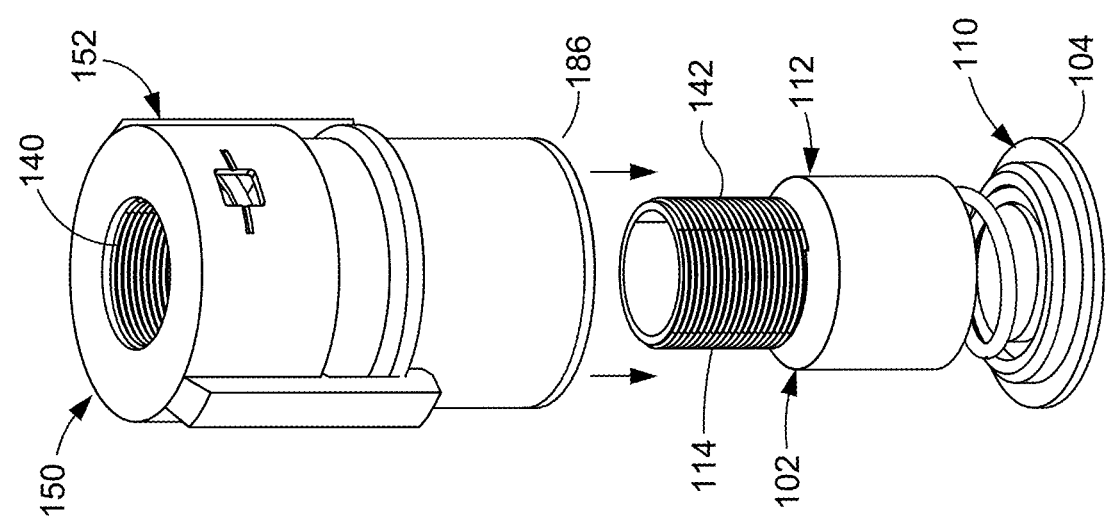
FIG. 17 is an exploded view of the cartridge mechanism showing the outer assembly separated from the inner assembly.

Referring to FIGS. 8-10, shown is an example of the outer assembly 150, which includes an outer cap 152, a cylindrical outer body 176, and an outer spring 170. As mentioned above, the outer assembly 150 is removably couplable to the inner assembly 102. In this regard, the outer cap 152 has an outer cap upper portion 154 (FIG. 9) configured to be removably coupled to the inner cap upper portion 114 (FIG. 9). For example, FIGS. 9-10 show the outer cap 152 having an outer cap bore 156 containing internal threads 140 configured to engage the external threads 142 (FIGS. 5-7) of the inner cap upper portion 114, enabling removable coupling of the outer assembly 150 to the inner assembly 102, as shown in FIG. 17-18. However, in other examples not shown, the outer cap 152 can be removably coupled to the inner cap 112 via snap-on/snap-off engagement, partial-turn interlock (e.g., ¼-turn or ½-turn interlock), or any one of a variety of other arrangements for removably coupling the outer assembly 150 to the inner assembly 102.

The cartridge mechanism 100 includes a retention system 190 integrated into the outer assembly 150. The retention system 190 is configured to retain the outer cap 152 with the outer body 176 when the outer spring 170 is captured therebetween. In one example, the retention system 190 comprises a retaining rib 192 on the outer body 176, and two or more retaining arms 194 protruding from the outer cap wall 158. In the example shown, the retaining rib 192 extends circumferentially around the exterior of the outer body 176, and a pair of diametrically opposed retaining arms 194 protrude downwardly from the outer cap wall 158. Each retaining arm 194 has an inwardly protruding tab 196 on its free end. Each of the retaining arms 194 is outwardly deflectable to allow the tabs 196 on the ends of the retaining arms 194 to move over and engage the retaining rib 192, thereby retaining the outer cap 152 with the outer body 176, as may be desirable during installation and removal of the outer assembly 150 from the inner assembly 102 and/or during recalibration of the outer spring 170, as described below.

In FIGS. 8-10, the outer body 176 has an outer body lower portion 180, an outer body intermediate portion 182, and an outer body upper portion 178. The outer body upper portion 178 is configured to fit within the annular chamber 166 of the outer cap 152. In this regard, the outer cap wall 158 configured to surround the outer body 176. The outer cap wall 158 is axially movable over the outer body 176 during compression of the cartridge mechanism 100. The outer body 176 has an outer body upper edge 184 and an outer body lower edge 186. The outer body lower edge 186 is configured to rest on the base plate 104 of the inner assembly 102. As mentioned above, the outer body lower edge 186 is configured to be received within the base plate notch 110 of the base plate 104 when the cartridge mechanism 100 is sufficiently compressed.

Referring to FIGS. 11-15, the outer body intermediate portion 182 contains a spring support 202 located in an interior of the outer body 176. As described below, the outer spring 170 is capturable between the spring support 202 and the outer cap 152. The spring support 202 is configured to support the lower end of the outer spring 170. In the example shown, the spring support 202 is a cylindrical element that is assembled with the outer body 176. However, in other examples not shown, the spring support 202 can be integrally formed with the outer body 176, and can be provided in any one of a variety of configurations capable of supporting the lower end of the outer spring 170, and is not limited to the cylindrically-shaped spring support 202 shown in the figures. For example, the spring support 202 can be provided as a plurality of circumferentially spaced elements (not shown) protruding inwardly from the outer body 176, and which support the outer spring 170 in a manner that results in the desired clamping force exerted by the temporary fastener 250 on the structure 400 when the cartridge mechanism 100 (i.e., the inner spring 126 and outer spring 170) is compressed by a predetermined amount of compressive displacement.

In FIGS. 11-15, the spring support 202 is configured as a spring setter 204 that allows for axial adjustment of its position in the outer body 176. In the example shown, the outer body intermediate portion 182 contains internal threads 140. The spring setter 204 has external threads 142 configured to engage with the internal threads 140 of the outer body intermediate portion 182. As shown in FIGS. 13-15, the spring setter 204 can be installed via the use of a spring setter tool 220. In example shown, the spring setter tool 220 is a thumbscrew 222 having a tool portion 224 and a grasping portion 226. The grasping portion 226 is configured to be grasped by the thumb and forefinger of a technician. The tool portion 224 contains mechanical features 206 in the form of axial grooves 208 formed on its exterior surface of the tool portion 224, and which are configured to engage with axial grooves 208 formed on the inner surface of the spring setter 204. The tool portion 224 is inserted into the spring setter 204 for picking up the spring setter 204 and inserting it into the outer body 176. Rotation of the thumbscrew 222 engages the external threads 142 of the spring setter 204 with the internal threads 140 of the body intermediate portion. Once the spring setter 204 is threadably engaged to the outer body 176, the thumbscrew 222 can be further rotated in either direction for adjusting the axial position of the spring setter 204 within the outer body 176 as a means to apply or adjust a preload on the outer spring 170 when assembled with the outer cap 152.

Referring to FIGS. 9-10, the outer spring 170 is a coil spring captured between the outer body 176 and the outer cap 152. The outer cap upper portion 154 has an annular groove 168 for receiving the upper end of the outer spring 170. As mentioned above, the lower end of the outer spring 170 rests on the spring support 202. The outer spring 170 is larger in diameter than the inner spring 126, allowing the outer spring 170 to be arranged in parallel to the inner spring 126. As mentioned above, the outer assembly 150 is removably coupled to the inner assembly 102 in a manner such that compression of the cartridge mechanism 100 during tightening of the temporary fastener 250 results in displacement (i.e., compression) of the outer spring 170 and the inner spring 126 by equal amounts.

The outer spring 170 is calibrated to provide an engineering-specified clamping force to be exerted on the structure 400 by the temporary fastener 250 at a predetermined level of compressive displacement (i.e., compression) of the inner and outer springs 126, 170. The outer spring 170 can be calibrated in house and/or by an external party to meet predetermined force and deflection (i.e., compressive displacement) requirements to ensure that the clamping force exerted by the temporary fastener 250 does not over-stress the structure 400, yet applies a sufficient amount of clamping force to place the structural components 402 (e.g., structural layers) in a nominal state to allow for the measurement of any gaps occurring between the structural components 402, as mentioned above.

Referring to FIG. 16, shown is an example of a calibration machine 230 (e.g., a load cell or stress-strain machine) as may be used for adjusting the preload on the outer spring 170 prior to and/or during the process of installing a plurality of temporary fasteners 250 (FIG. 35) in a structure 400 (FIG. 35) using the cartridge mechanism 100. The calibration machine 230 is configured to compress the outer assembly 150 while monitoring the compressive force (e.g., in pounds) of the outer spring 170 and its corresponding compressive displacement (e.g., in inches). Although the outer spring 170 is calibrated prior to initial installation in an outer assembly 150, it may be desirable in some circumstances to use the calibration machine 230 to recalibrate the outer spring to verify that its force-displacement characteristics meet engineering requirements.

Recalibration of the outer spring 170 can be performed before starting the installation of a series of temporary fasteners 250 as a check on the force-displacement characteristics of the outer spring 170 as received from an external supplier (e.g., a calibration vendor). Alternatively or additionally, recalibration can be performed at one or more times during the process of installing a series of temporary fasteners 250 to verify that the force-displacement characteristics of the outer spring 170 remain unchanged and are within allowable limits. During recalibration using the calibration machine 230, the spring setter 204 (FIG. 12) is rotatable via the thumbscrew 222 (FIG. 15) to iteratively adjust the axial position of the spring setter 204 within the outer body 176 as a means to adjust the preload on the outer spring 170 until it meets force-displacement requirements. In this regard, the cartridge mechanism 100 contains a displacement indicating system 160 (e.g., a sight window 162—FIGS. 24-30) as described below for visually observing the displacement (i.e., compression) of the outer assembly 150 as the calibration machine 230 compresses the outer assembly 150 to ensure the outer spring 170 generates the correct amount of force per engineering requirements.

Referring to FIGS. 17-18, shown is the outer assembly 150 prior to its coupling to the inner assembly 102. As mentioned above, the outer cap 152 has internal threads 140 configured to engage with the external threads 142 on the inner cap 112, enabling removable coupling of the outer assembly 150 to the inner assembly 102 as shown in FIGS. 1-4. However, as indicated above, any one of a variety of alternative arrangements can be implemented for removably coupling the outer assembly 150 to the inner assembly 102.

Figure 21:
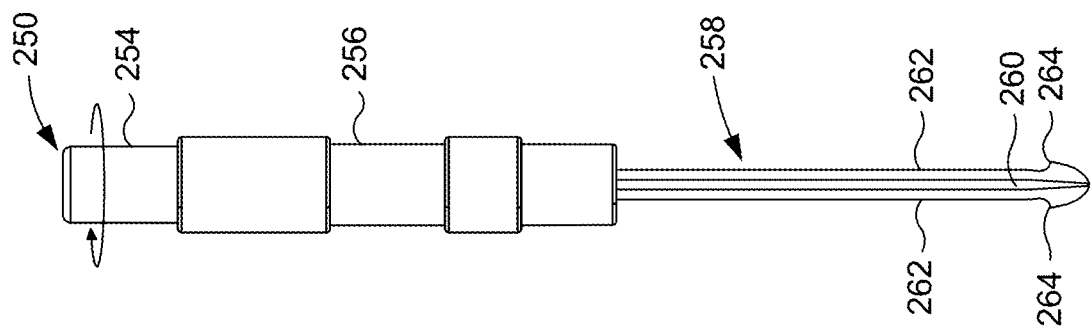
FIG. 21 shows the temporary fastener of FIG. 19 during axial retraction of the prongs, which is achieved by rotating the fastener head in the opposite direction required for tightening.
Figure 20:
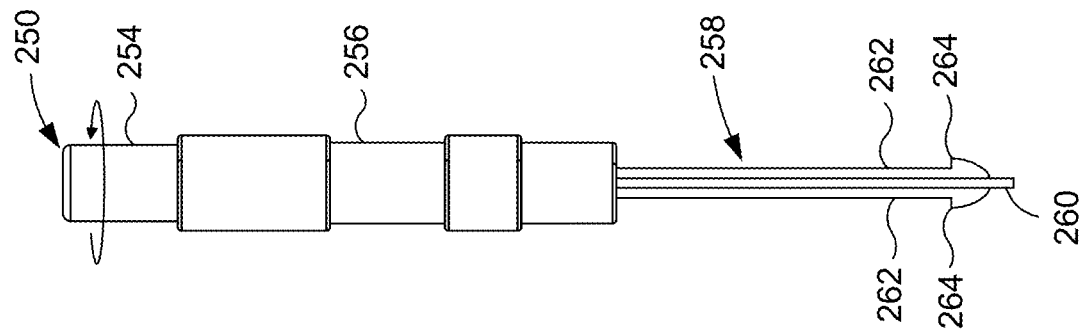
FIG. 20 is a side view of the temporary fastener of FIG. 19 showing axial extension of the prongs, which is achieved by rotating the fastener head.

Referring to FIGS. 19-21, shown is an example of a temporary fastener 250 in the form of a Cleco™, which is mountable to the cartridge mechanism 100 for installation in a fastener hole 252. As mentioned above, the Cleco™ is one of many of a variety of different types of reusable or temporary fasteners 250 that can be used with the cartridge mechanism 100 for the purpose of applying a consistent clamping force to a structure 400 at multiple fastener locations. The Cleco™ has a fastener head 254, a fastener body 256, and a pin assembly 258. The pin assembly 258 is comprised of a stationary splay pin 260 and a pair of prongs 262 that axially slide along opposite sides of the splay pin 260. At the end of each prong 262 is an outwardly protruding tang 264. The ends of the prongs 262 are biased toward each other such that when the tangs 264 move past the end of the splay pin 260 as shown in FIG. 21, the ends of the tangs 264 come together, which reduces the cross-sectional width of the end of the pin assembly 258 to a size allowing for insertion and removal of the pin assembly 258 from a fastener hole 252. When the prongs 262 are retracted, the ends of the prongs 262 move back over the splay pin 260 as shown in FIG. 20, causing the tangs 264 to spread apart, which locally increases the width of the end of the pin assembly 258 to a size that prevents removal of the pin assembly 258 from the fastener hole 252. Further retraction of the prongs 262 causes the tangs 264 to clamp up against the backside 406 of the structure 400 and apply a clamping force.

In the example shown, the Cleco™ has a thread-type arrangement having an internal shaft (not shown). Extension or retraction of the prongs 262 is effected by rotating the fastener head 254 to rotate the internal shaft, which causes extension or retraction of the prongs 262, depending on the direction of rotation of the fastener head 254. Although not shown, the fastener head 254 of the Cleco™ can be manually rotated using the fingers of a technician or with the aid of a tool such as a finger ratchet (not shown). In some examples, the fastener head 254 can be configured as a nut (not shown) that is rotatable via a nut driver that is driven by a device such as a pneumatic driver (not shown).

As an alternative to a thread-type arrangement, the Cleco™ can be provided in a spring-type arrangement having an internal spring mechanism (not shown) that biases the prongs 262 in the retracted position (FIG. 20). Extension of the prongs 262 is effected by depressing the fastener head 254 using specialty pliers (e.g., Cleco™ pliers—not shown) to move the tangs 264 past the end of the splay pin 260 to thereby allow the pin assembly 258 to be inserted into a fastener hole 252. Release of the fastener head 254 causes the internal spring mechanism to retract the prongs 262 until the tangs 264 slide over the end of the splay pin 260 and bear against the backside 406 of the structure 400 and apply a clamping force.

Figure 23:
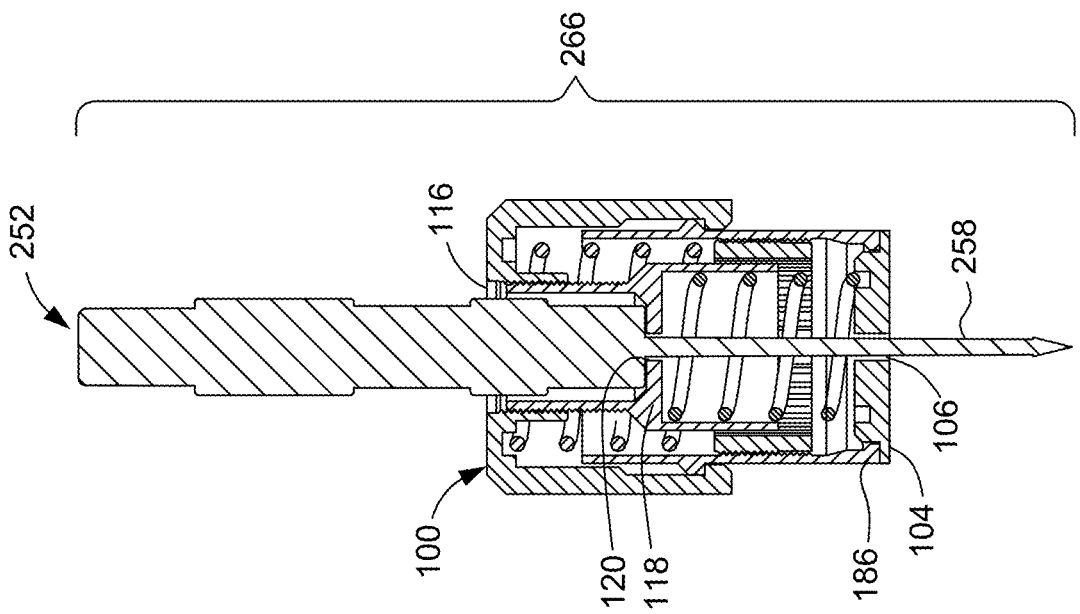
FIG. 23 is a sectional view of the fastener-cartridge assembly of FIG. 22.
Figure 22:
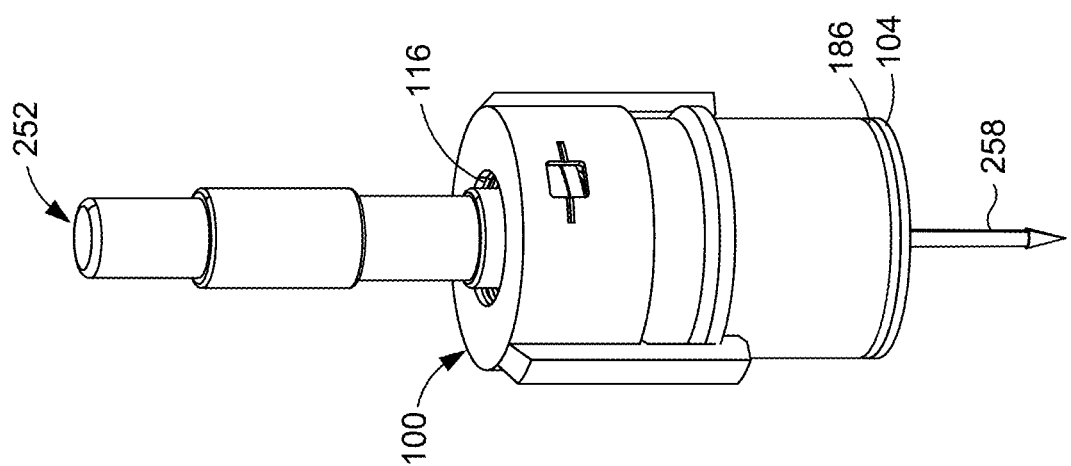
FIG. 22 shows the temporary fastener of FIGS. 20-21 inserted in a cartridge mechanism to form a fastener-cartridge assembly.
Figure 25:
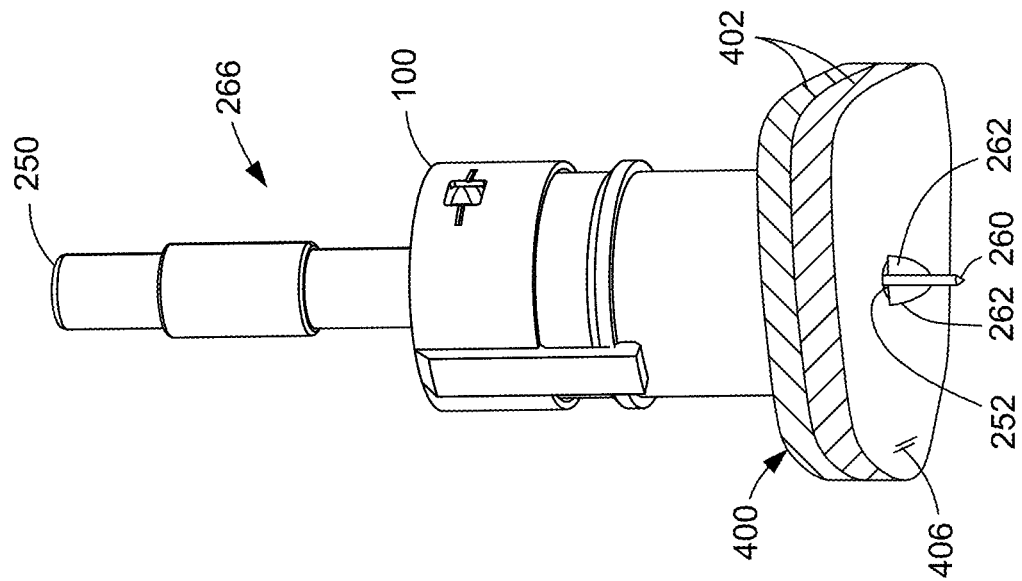
FIG. 25 is a bottom-up perspective view of the fastener-cartridge assembly after installation in the fastener hole and showing the prongs of the pin assembly clamped up against the backside of the structure.
Figure 24:
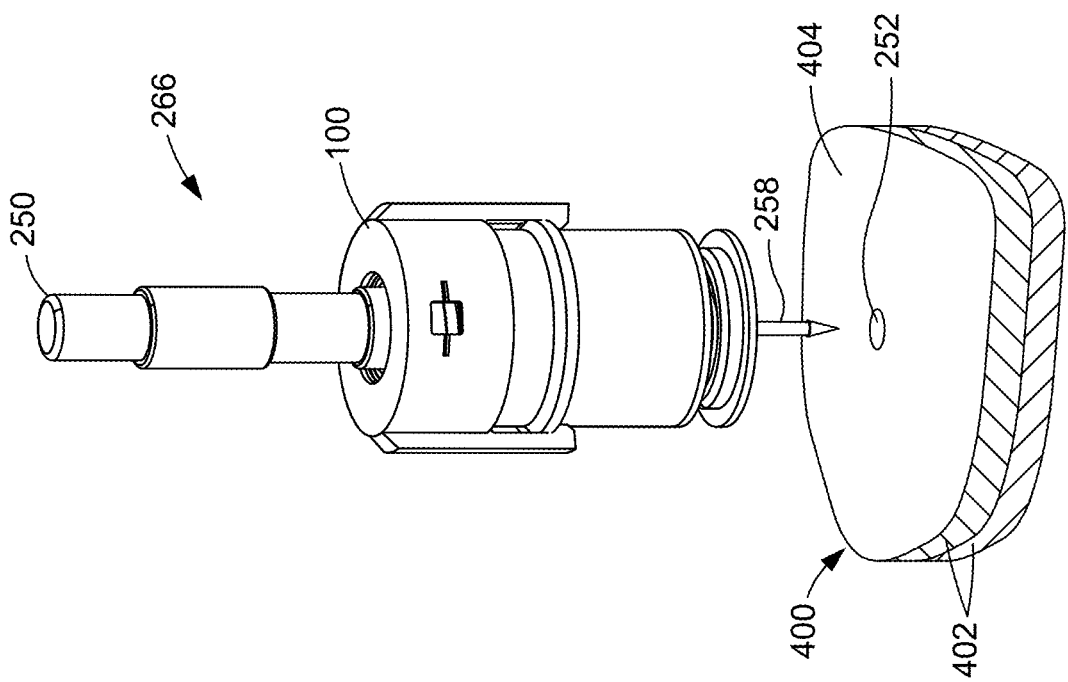
FIG. 24 is a top-down perspective view of the fastener-cartridge assembly during installation into a fastener hole in the structure.

Referring to FIGS. 22-25, shown is a temporary fastener 250 (i.e., a Cleco™) inserted into the inner cap bore 116 of a cartridge mechanism 100 to form a fastener-cartridge assembly 266. As shown in FIG. 23, the pin assembly 258 of the temporary fastener 250 extends through the cartridge mechanism 100. FIG. 24 shows the fastener-cartridge assembly 266 during installation into a fastener hole 252 in the structure 400. FIG. 25 shows the prongs 262 of the pin assembly 258 clamped up against the backside 406 of the structure 400 after tightening the temporary fastener 250 as described below.

Figure 29:
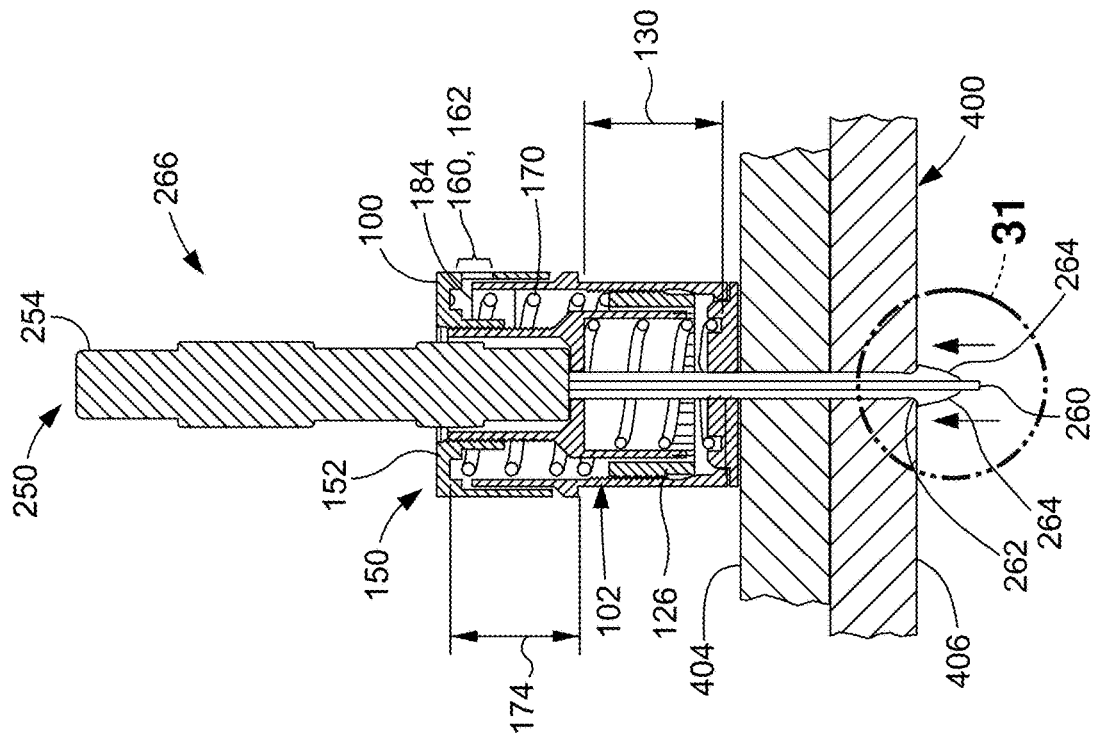
FIG. 29 is a sectional view of the fastener-cartridge assembly of FIG. 29 showing both the outer spring and the inner spring in a compressed state due to tightening of the temporary fastener.
Figure 30:
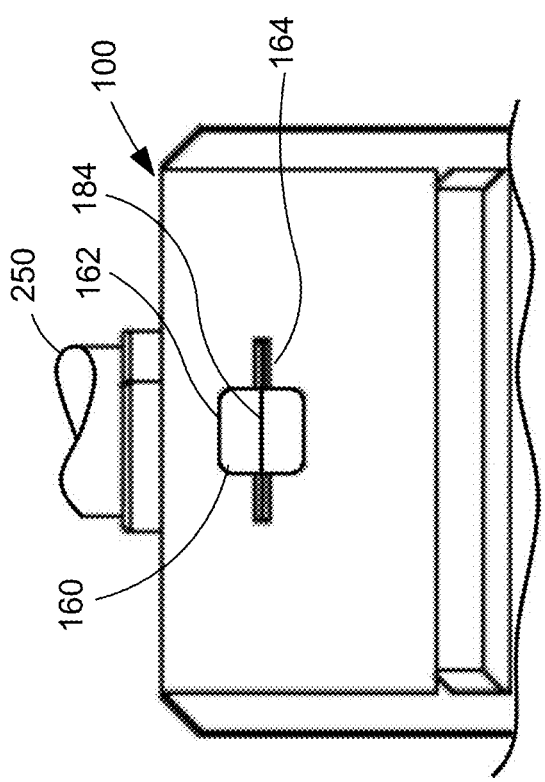
FIG. 30 is a magnified view of the portion of the fastener-cartridge assembly identified by reference numeral 30 of FIG. 28, and showing the outer body upper edge in the sight site window as an indication that the preliminary clamping force has been attained due to the tightening of the temporary fastener.

Referring to FIGS. 26-31, shown is fastener-cartridge assembly 266 installed in a fastener hole 252 of a structure 400, and illustrating the positions of the various components of the outer assembly 150 and inner assembly 102 prior to tightening the temporary fastener 250 (FIGS. 26-27), and after tightening the temporary fastener 250 (FIGS. 29-30). As mentioned above, the cartridge mechanism 100 includes a displacement indicating system 160 integrated into the outer assembly 150. The displacement indicating system 160 is configured to indicate the amount of compressive displacement of the inner spring 126 and outer spring 170 that represents attainment of a desired preliminary clamping force exerted on the structure 400 by the temporary fastener 250. The displacement indicating system 160 is integrated into the outer cap 152 and/or the outer body 176 of the outer assembly 150. In the example shown, the displacement indicating system 160 comprises a sight window 162 formed in the outer cap wall 158 at an axial location where the outer body upper edge 184 becomes visible in the sight window 162 when the inner spring 126 and outer spring 170 have been compressed by the amount representing the desired preliminary clamping force exerted on the structure 400 by the temporary fastener 250. Although shown as rectangularly shaped, the sight window 162 can have other shapes such as a round shape.

The sight window 162 can optionally include one or more alignment features 164 such as slots, notches, or markings formed on or extending through the outer cap wall 158. For example, the sight window 162 in FIGS. 26, 28 and 30 has a pair of notches formed on the surface of the outer cap wall 158 on opposite sides of the sight window 162. The sight window 162 is axially longer than the notches to allow for visual observation of the movement of the outer body upper edge 184 as it approaches the alignment notches during tightening of the temporary fastener 250. Regardless of its configuration, the alignment feature is positioned at the precise axial location where alignment with the outer body upper edge 184 represents attainment of the preliminary clamping force on the structure 400 by the temporary fastener 250. Although the displacement indicating system 160 is configured as a sight window 162, the displacement indicating system 160 can be provided in any one of a variety of different configurations capable of allowing for visual indication or observation of the amount of compressive displacement of the inner and outer springs 126, 170 that corresponds to attainment of the preliminary clamping force on the structure 400 by the temporary fastener 250.

Figure 27:
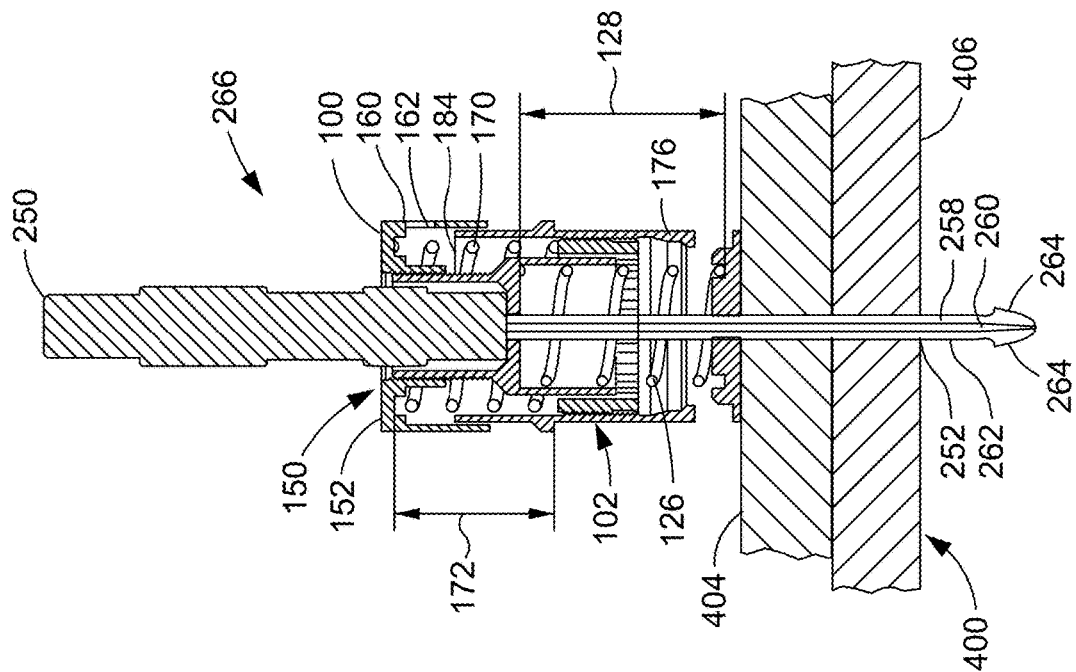
FIG. 27 is a sectional view of the fastener-cartridge assembly of FIG. 26 and showing the outer spring and the inner spring in a free state.
Figure 26:
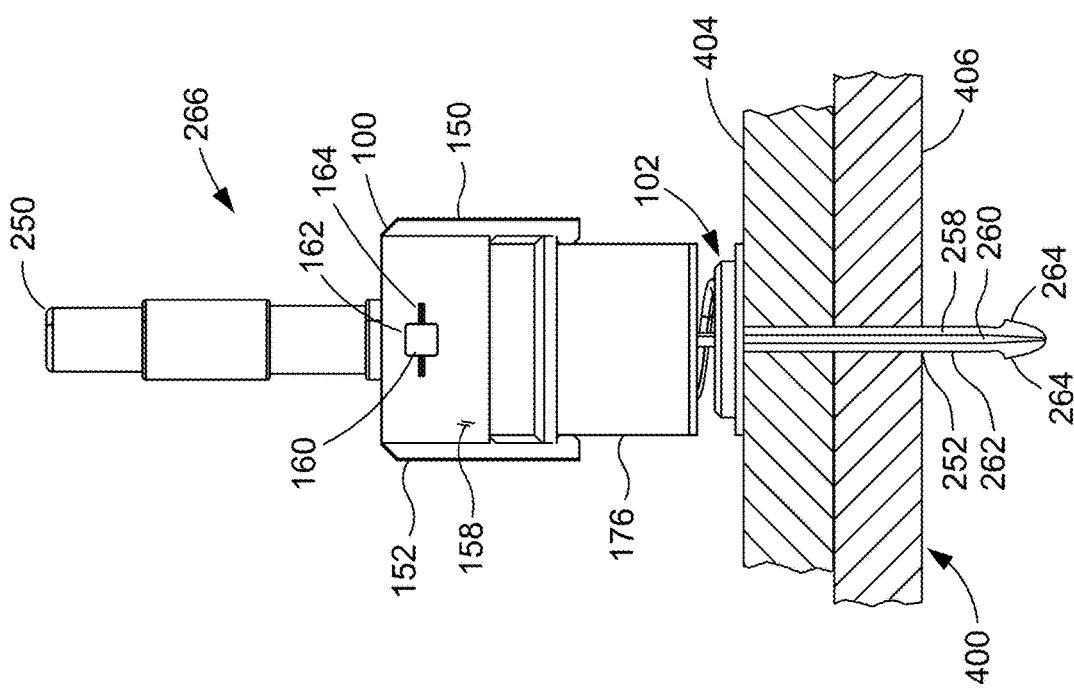
FIG. 26 is a side view of the fastener-cartridge assembly showing the pin assembly prior to clamp up against the backside of the structure.

FIGS. 26-27 show the fastener-cartridge assembly 266 prior to clamp up of the pin assembly 258 against the backside 406 of the structure 400. The tangs 264 of the pin assembly 258 have been extended below the bottom of the splay pin 260. The sectional view of FIG. 27 shows the initial length 172 of the outer spring 170 and the initial length 128 of the inner spring 126 in their initial states (e.g., free states) prior to tightening of the temporary fastener 250. As shown in FIG. 26, the outer body upper edge 184 is not visible in the sight window 162 of the outer cap 152. FIG. 27 shows the outer body upper edge 184 located below the sight window 162.

Figure 28:
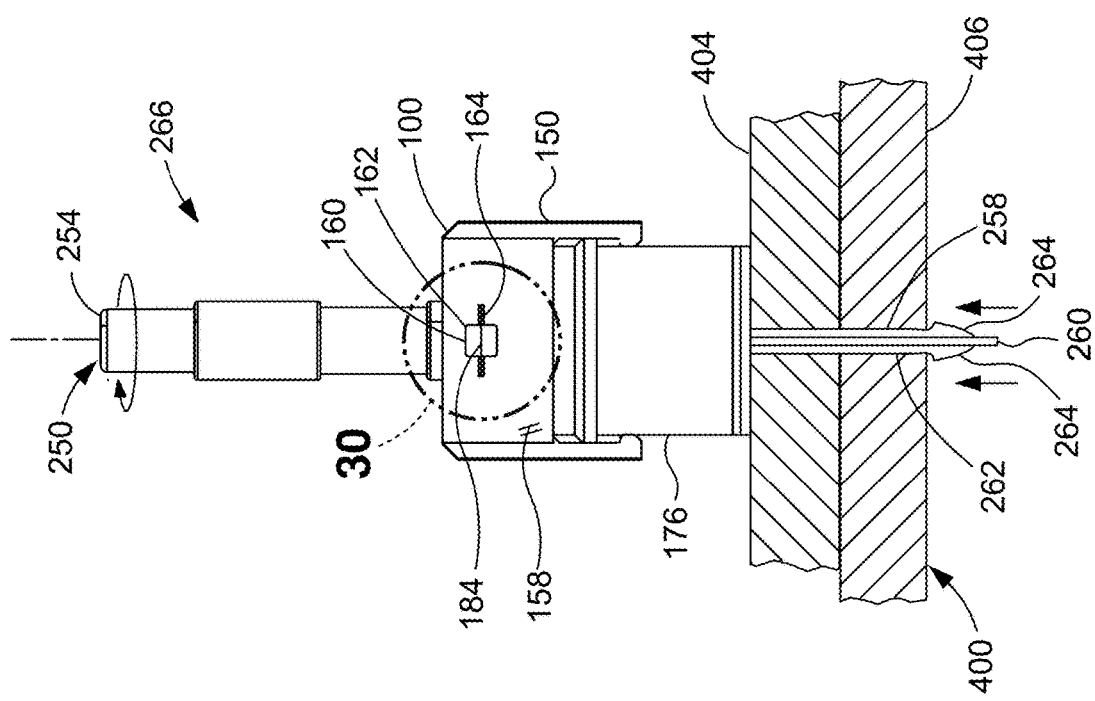
FIG. 28 is a side view of the fastener-cartridge assembly of FIG. 26 after tightening of the temporary fastener causing compressive displacement (i.e., compression) of the inner spring and outer spring by an amount representing attainment of a desired preliminary clamping force exerted on the structure, as indicated by the appearance of an upper edge of the outer body within a sight window formed in the outer cap.
Figure 31:
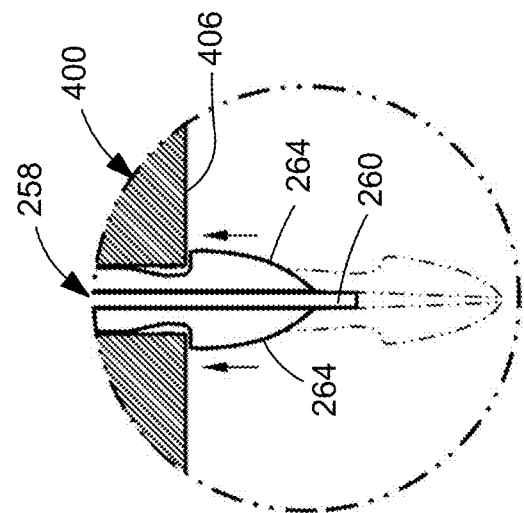
FIG. 31 is a magnified view of the portion of the fastener-cartridge assembly identified by reference numeral 31 of FIG. 29, and illustrating the prongs of the temporary fastener clamped up against the backside of the structure to generate the preliminary clamping force.

FIGS. 28-29 show the fastener-cartridge assembly 266 after clamp up of the pin assembly 258 against the backside 406 of the structure 400 due to rotation of the fastener head 254 of the temporary fastener 250 (e.g., Cleco™). As can be seen, the tangs 264 of the pin assembly 258 have been retracted upwardly over the splay pin 260 and are shown clamped up against the backside 406 of the structure 400. The sectional view of FIG. 29 shows the final length 174 of the outer spring 170 and the final length 130 of the inner spring 126 in their compressed states after tightening of the temporary fastener 250, and which is shorter than their initial lengths 128, 172. As shown in FIGS. 28-29, the outer body upper edge 184 is visible in the sight window 162. FIG. 30 shows the outer body upper edge 184 aligned with the alignment features 164 (e.g., notches), indicating that the temporary fastener 250 has been tightened by an amount representing attainment of the preliminary clamping force on the structure 400. FIG. 31 shows the tangs 264 of the temporary fastener 250 clamped up against the backside 406 of the structure 400.

As mentioned above, the inner spring 126 is preferably uncalibrated, and has a spring constant substantially equal to the spring constant of the outer spring 170, which is calibrated to one-half the predetermined clamping force at the compressive displacement indicated by the displacement indicating system 160. In some examples, the spring constant of the inner spring 126 is preferably within 20% of the spring constant of the outer spring 170. Furthermore, in some examples, the spring constant of the inner spring 126 is preferably no greater than the spring constant of the outer spring 170.

Figure 32:
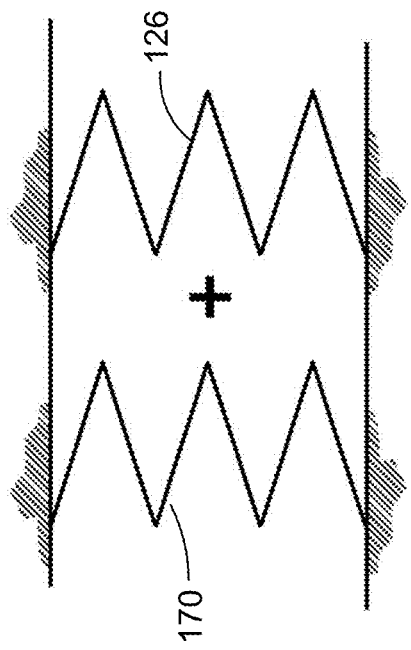
FIG. 32 is a diagrammatic illustration of the parallel arrangement of the inner spring and the outer spring of the cartridge mechanism, and in which the inner spring is uncalibrated and has a spring constant substantially equal to that of the outer spring, which is calibrated to one-half the preliminary clamping force when compressed by the amount indicated by the displacement indicating system (e.g., sight window)

Referring to FIG. 32, shown is diagrammatic illustration of the arrangement of the inner spring 126 and the outer spring 170 of the cartridge mechanism 100, which is based on the physics principle of dual springs in a parallel system. In this arrangement, the total force exerted by the springs is defined by the equation F(total)=F(1)+F(2); wherein F=kx, k=spring constant, and x=spring displacement. As a result of the substantially equal spring constants of the inner spring 126 and outer spring 170 in combination with their parallel arrangement causing substantially equal displacements (i.e., equal compression), tightening of the temporary fastener 250 until the outer body upper edge 184 (FIG. 29) appears within the sight window 162 (FIG. 29) represents attainment of the preliminary clamping force on the structure 400.

As mentioned above, the outer spring 170 is calibrated to one-half the predetermined clamping force at the compressive displacement indicated by the displacement indicating system 160 (e.g., the outer body upper edge 184 is visible in the sight window 162). As a result, decoupling the outer spring 170 from the inner spring 126 reduces the clamping pressure on the structure 400 to an engineering-specified final clamping force equal to one-half the preliminary clamping force. In the present example, the outer spring 170 is decoupled from the inner spring 126 by removing the outer assembly 150 from the inner assembly 102. For example, the outer assembly 150 is removable from the inner assembly 102 by rotating the outer cap 152 relative to the inner cap 112 until the inner threads of the outer cap 152 are disengaged from the inner threads of the inner cap 112, as shown in FIG. 46.

Removal of the outer assembly 150 from the inner assembly 102 allows for re-use of the outer assembly 150 for the installation of other temporary fasteners 250, thereby reducing the total quantity of calibrated springs required for installing temporary fasteners 250 in a structure 400. Due to the high costs associated with acquiring and maintaining calibrated springs relative to the cost of uncalibrated springs, a reduction in the total quantity of calibrated springs represents a significant reduction in the total cost of a manufacturing program requiring thousands of temporary fasteners 250 for the assembly of a single structure 400.

Figure 34:
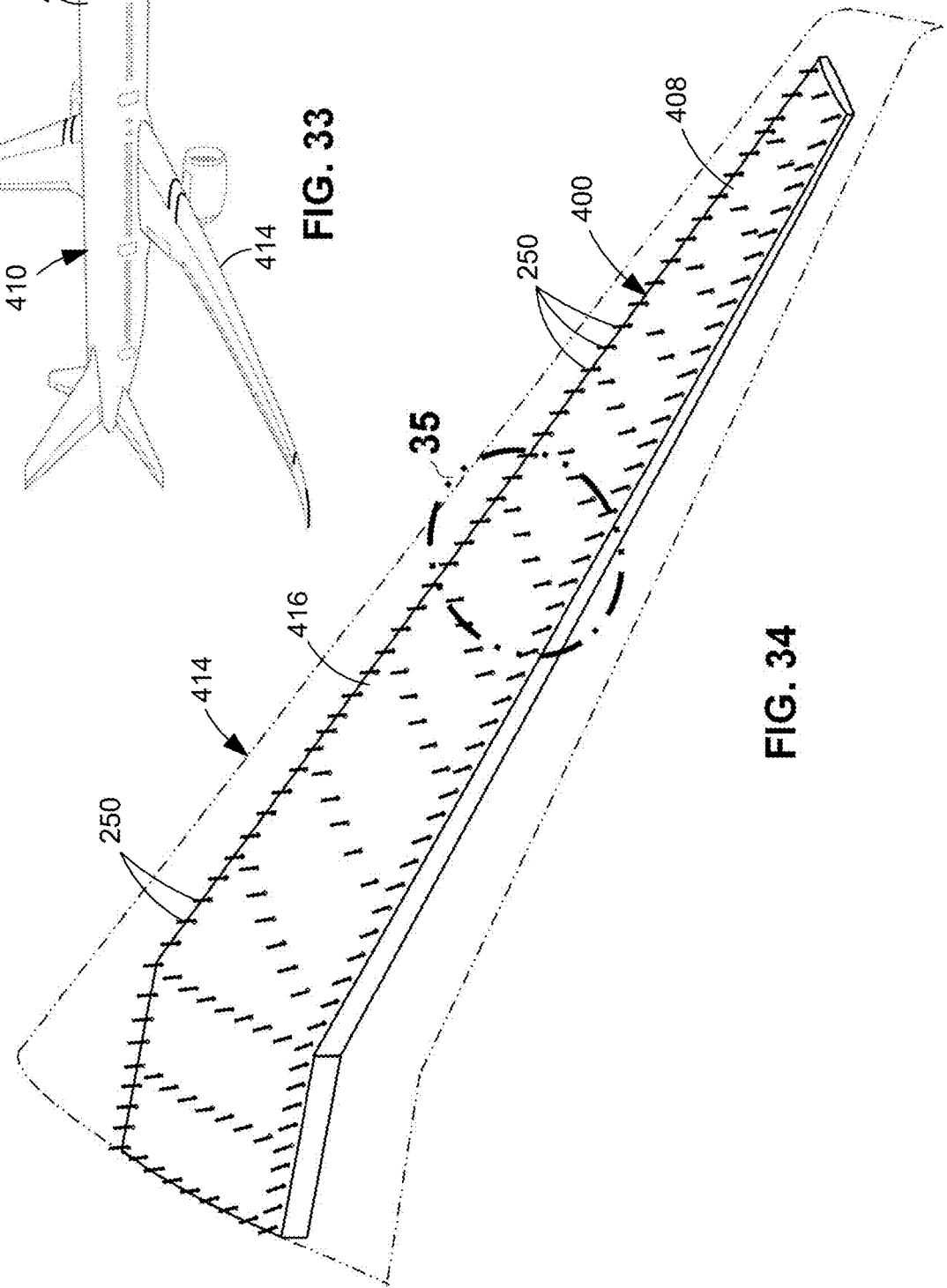
FIG. 34 shows an example of a structure in the form of a wing box of an aircraft wing, and which represents an interim manufacturing assembly into which a plurality of temporary fasteners have been installed with the aid of the presently-disclosed cartridge mechanism.
Figure 35:
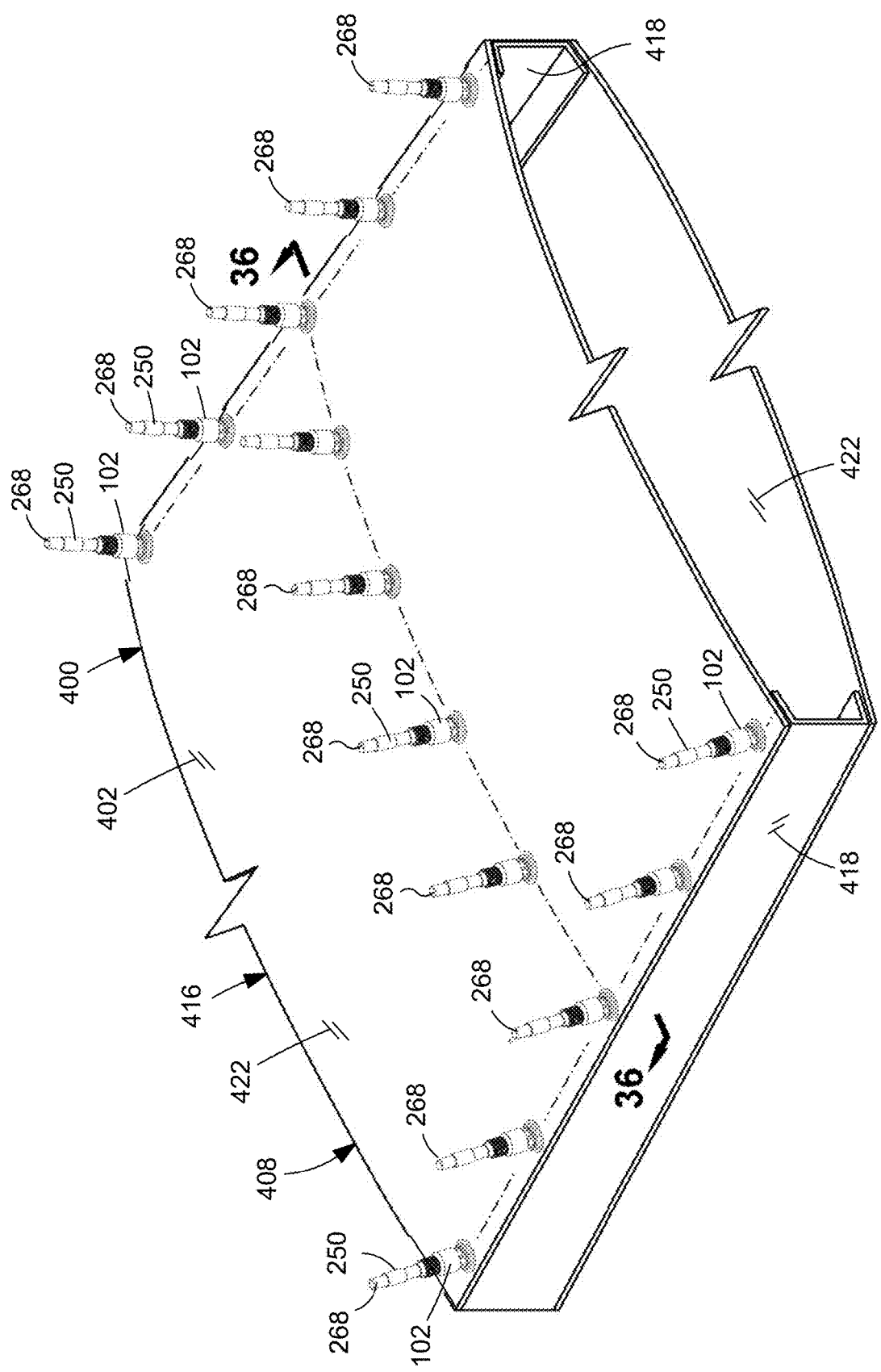
FIG. 35 is a magnified view of a portion of the aircraft wing of FIG. 34 showing a plurality of fastener-inner assemblies, each containing a temporary fastener installed in fastener hole (e.g., pilot hole) in the structure.
Figure 36:
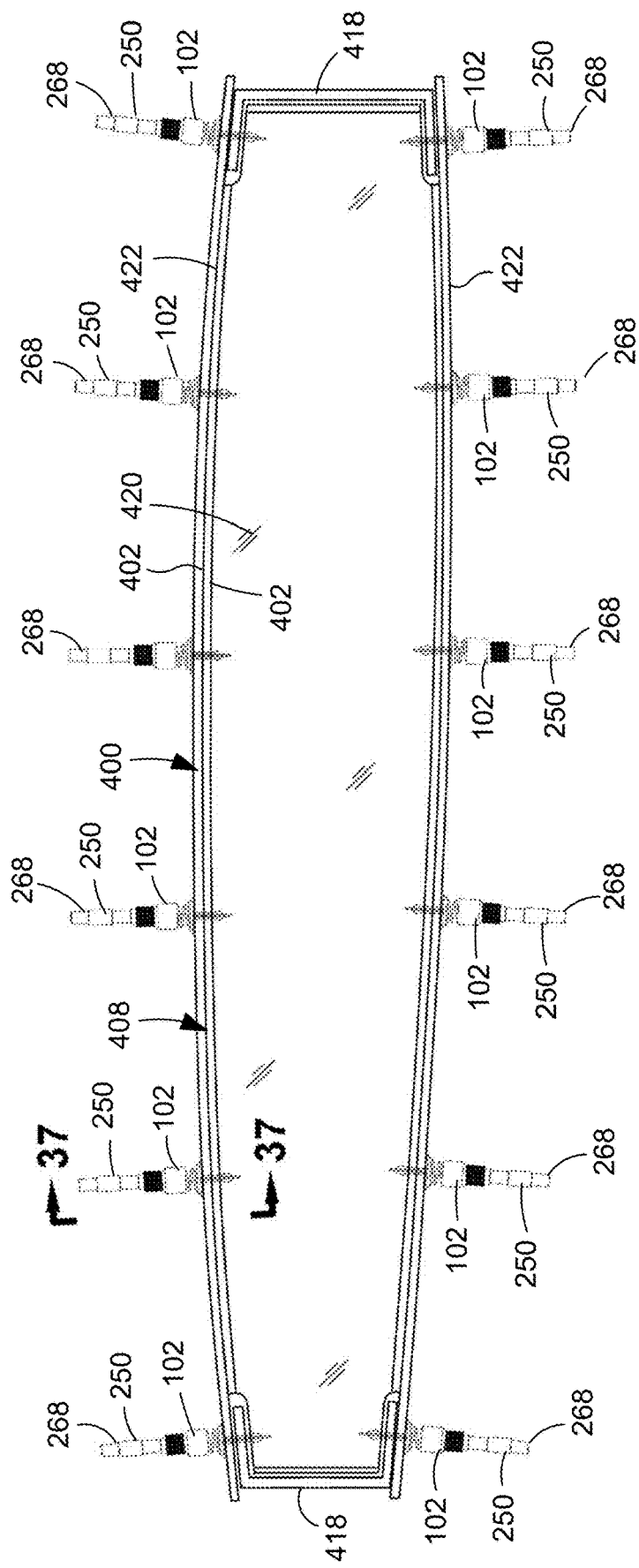
FIG. 36 is a sectional view taken along line 36 of FIG. 35 and showing the temporary fasteners for clamping the upper and lower wing skins to the wing ribs and wing spars of the aircraft wing.
Figure 37:
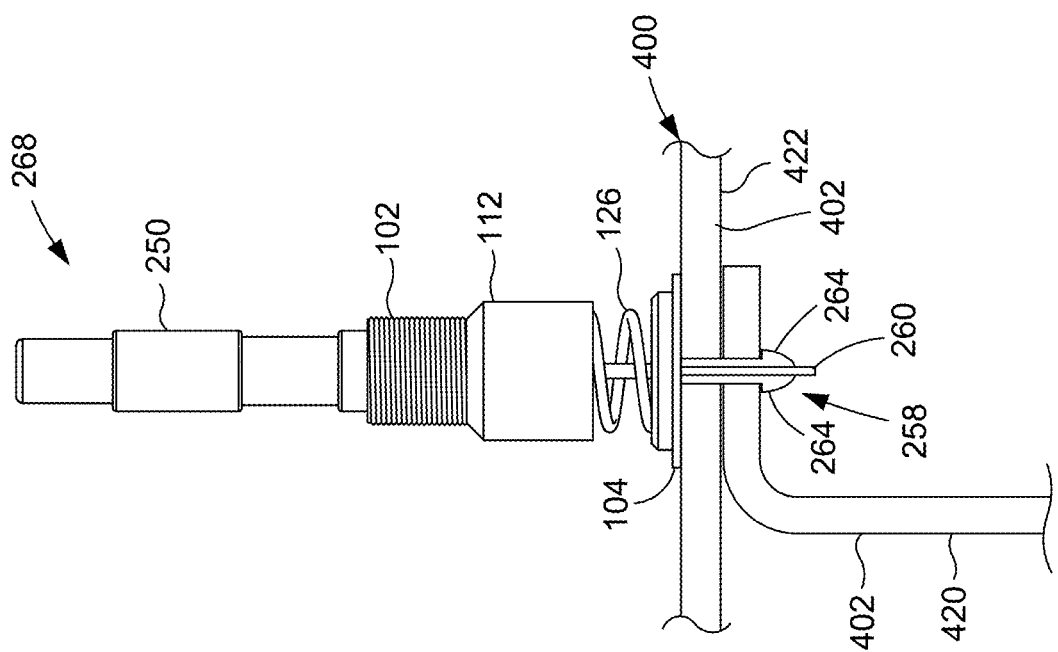
FIG. 37 is a sectional view taken along line 37 of FIG. 36 and illustrating a fastener-inner assembly containing temporary fastener for clamping a wing skin to a wing rib.

Referring to FIGS. 33-36, shown in FIG. 33 is an example of an aircraft 410 having a fuselage 412 and a pair of wings 414. FIG. 34 shows an example of a structure 400 in the form of a wing box 416 of one of the wings 414. The wing box 416 represents an interim manufacturing assembly 408 containing a plurality of temporary fasteners 250 installed in fastener holes 252 with the aid of the cartridge mechanism 100. FIG. 35 shows a portion of the wing box 416, which is comprised of upper and lower wing skins 422, a plurality of wing ribs 420 (FIG. 36), and front and rear wing spars 418. The wing box 416 is held together using a plurality of fastener-inner assemblies 268, each comprising a temporary fastener 250 and an inner assembly 102 of the cartridge mechanism 100. FIG. 36 is a sectional view of the wing box 416 showing the temporary fasteners 250 attaching the upper and lower wing skins 422 to the wing ribs 420 and wing spars 418. FIG. 37 shows one of the fastener-inner assemblies 268 clamping the upper wing skin 422 to a wing rib 420 via a temporary fastener 250 coupled to an inner assembly 102.

The inner assembly 102 at each temporary fastener 250 includes an inner cap 112 on which the temporary fastener 250 is mounted, and an uncalibrated inner spring 126 located between the inner cap 112 and the structure 400. In the example of FIG. 37, the inner spring 126 is captured between the inner cap 112 and the base plate 104, which rests on the structure 400. Although not shown in FIGS. 35-37, each temporary fastener 250 was installed with the use of an outer assembly 150, which has an outer cap 152 that is removably couplable to the inner cap 112 of each inner assembly 102. In addition, the outer assembly 150 has an outer spring 170 located between the outer cap 152 and the structure 400 when the outer assembly 150 is coupled to an inner assembly 102. As described above, the outer assembly 150 includes a displacement indicating system 160 configured to indicate an amount of compressive displacement of the inner spring 126 and outer spring 170 that represents attainment of a desired preliminary clamping force on the structure 400 at each fastener hole 252 due to tightening of the temporary fastener 250 at that location. The inner spring 126 of each inner assembly 102 is uncalibrated and has a spring constant substantially equal to that of the outer spring 170, which is calibrated to one-half the preliminary clamping force at the amount of compressive displacement indicated by the displacement indicating system 160. As described above, the outer assembly 150 is removable from each inner assembly 102 after installation of a temporary fastener 250, and is reusable on the inner assemblies 102 of other temporary fasteners 250 in a manner resulting in a final clamping force at each temporary fastener 250 of approximately one-half the preliminary clamping force.

Figure 38:
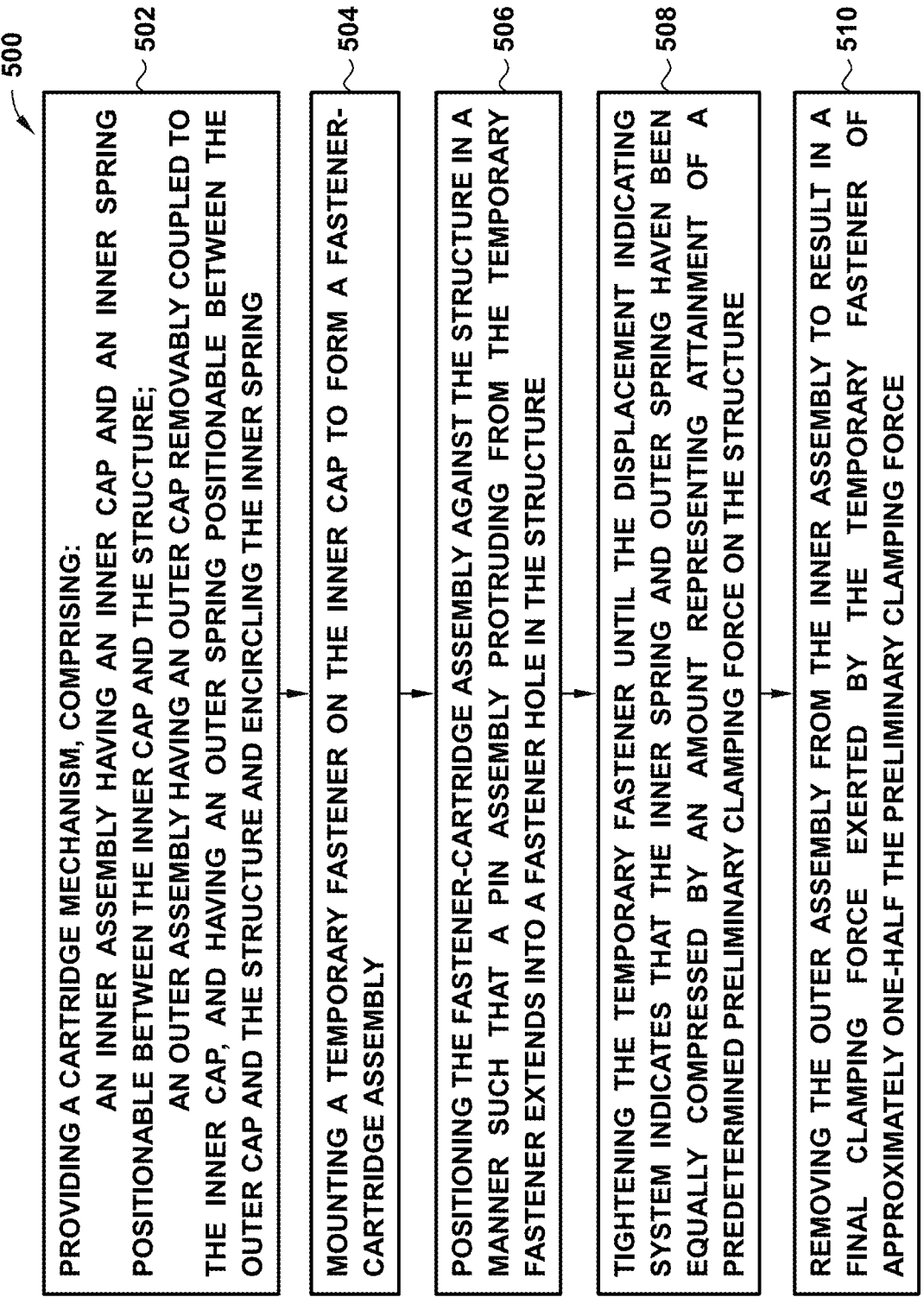
FIG. 38 is a flowchart of operations included in a method of monitoring the clamping force exerted on a structure by a temporary fastener during installation.
Figure 41:
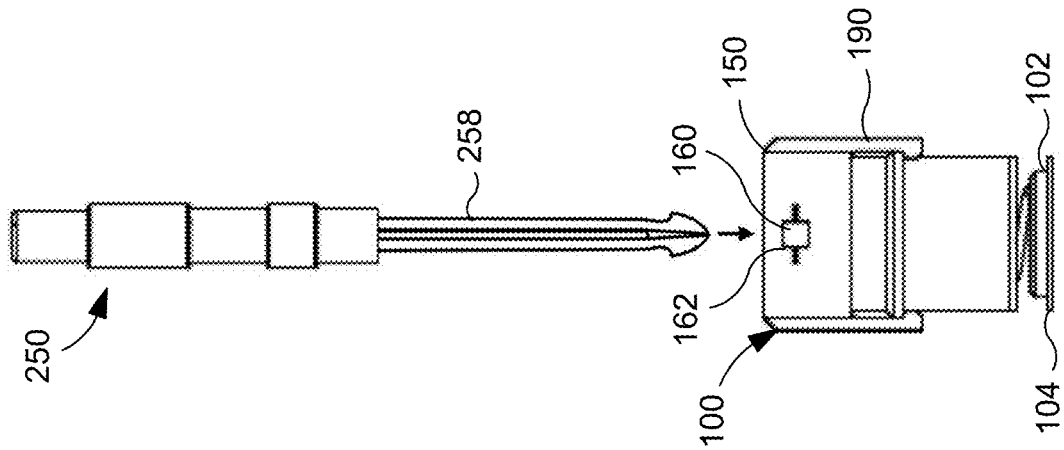
FIG. 41 shows a temporary fastener prior to mounting to the cartridge mechanism to thereby form a fastener-cartridge assembly.
Figure 40:
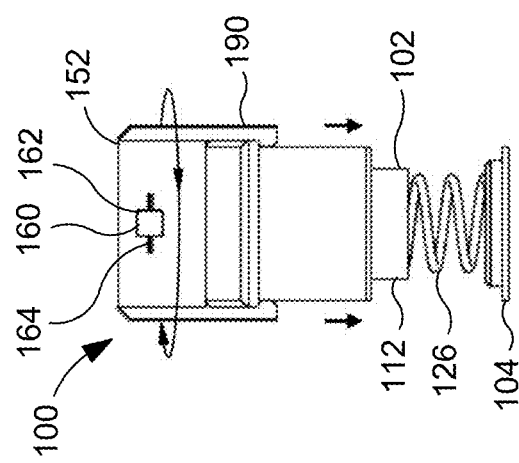
FIG. 40 shows engagement of the outer assembly to the inner assembly.
Figure 39:
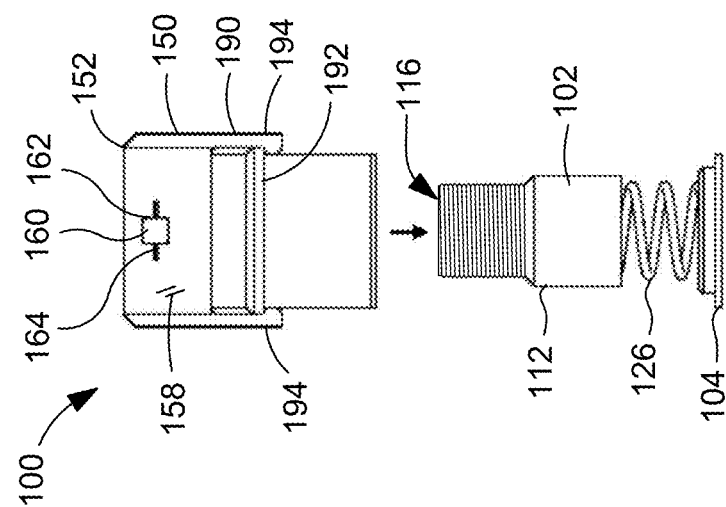
FIG. 39 shows an outer assembly of the cartridge mechanism prior to mating with an inner assembly.

Referring now to FIG. 38 with additional reference to FIGS. 39-46, shown in FIG. 38 is a flow chart containing operations of a method 500 of monitoring the clamping force exerted on a structure 400 by a temporary fastener 250 during its installation. Referring to FIGS. 39-41, step 502 of the method 500 includes providing a cartridge mechanism 100 which, as described above, comprises an inner assembly 102 and an outer assembly 150. The inner assembly 102 has an inner cap 112 and an uncalibrated inner spring 126 positionable between the inner cap 112 and the structure 400. In FIG. 39, the inner spring 126 is captured between the inner cap 112 and the base plate 104, which is placed in direct contact with the structure 400.

The outer assembly 150 has an outer cap 152 removably couplable (e.g., threadably engageable) to the inner cap 112. In addition, the outer assembly 150 includes a calibrated outer spring 170 positioned between the outer cap 152 and the structure 400. In the example shown, the outer spring 170 encircles the inner spring 126. As described above, the outer cap 152 can be removably coupled to the inner cap 112 via threaded engagement, snap-on/snap-off engagement, partial-turn interlock, or any one of a variety of alternative arrangements for removably coupling the outer assembly 150 to the inner assembly 102. In the example of FIGS. 39-40, the outer cap 152 is threadably engaged to the inner cap 112 for coupling the outer assembly 150 to the inner assembly 102.

The outer assembly 150 includes the above-described displacement indicating system 160 which, in the example shown, comprises a sight window 162 and alignment features 164 (e.g., notches) formed in an outer cap wall 158. The method 500 can include retaining the outer cap 152 with the outer body 176 using a retention system 190 integrated into the outer assembly 150. In the example shown, retention of the outer cap 152 with the outer body 176 is achieved by engaging two or more retaining arms 194 protruding from the outer cap wall 158 with a retaining rib 192 extending circumferentially around the outer body 176. As mentioned above, the inner spring 126 is preferably uncalibrated and has a spring constant substantially equal to that of the outer spring 170, which is calibrated to one-half of a desired preliminary clamping force exerted on the structure 400 at a compressive displacement indicated by the displacement indicating system 160.

Referring briefly to FIGS. 11-16, some examples of step 502 include adjusting the preload on the outer spring 170 prior to mating the outer assembly 150 to the inner assembly 102. For example, step 502 can include installing a cylindrical spring setter 204 in the outer body 176 of the outer assembly 150 by engaging external threads 142 of the spring setter 204 with internal threads 140 of the outer body intermediate portion 182 to thereby form a setter-body subassembly 200, as described above. Once the spring setter 204 is installed, the method 500 includes assembling the setter-body subassembly 200 (FIGS. 9 and 15) with the outer spring 170 and the outer cap 152 to thereby form the outer assembly 150.

In some examples, the method 500 can include recalibrating or checking the force-displacement characteristics of the outer spring 170 when received from an external supplier. Recalibration of the outer spring 170 can be performed prior to installing a plurality of temporary fasteners 250 in a structure 400. Alternatively or additionally, the outer spring 170 can be recalibrated at one or more times during the process of installing a series of temporary fasteners 250 to verify that the force-displacement characteristics of the outer spring 170 remain within allowable limits. For this task, the method 500 can include using the calibration machine 230 shown in FIG. 16 or similar device to iteratively adjust the axial position of the spring setter 204 within the outer body 176. As described above, adjustment of the spring setter 204 comprises rotating the spring setter 204 until the outer spring 170 is recalibrated to one-half the desired preliminary clamping force when the outer spring 170 is compressed by the amount indicated by the displacement indicating system 160 which, in the present example, occurs when the outer body upper edge 184 is aligned with the alignment notches on the side of the sight window 162 formed in the outer cap wall 158, as shown in FIG. 16.

Installation of the spring setter 204 can be performed with the aid of the thumbscrew 222 shown in FIGS. 13-15. As described above, the thumbscrew 222 includes a grasping portion 226 which is grasped by the thumb and forefinger of a technician. The tool portion 224 of the thumbscrew 222 is inserted into the spring setter 204 to engage mechanical features 206 (e.g., axial grooves 208) formed on the spring setter 204 with matching mechanical features 206 (e.g., axial grooves 208) formed on the tool portion 224. Using the thumbscrew 222, the spring setter 204 is picked up and inserted into the outer body 176 and manually rotated to engage the threads.

Referring to FIG. 41, step 504 of the method 500 includes mounting a temporary fastener 250 on the inner cap 112 of the cartridge mechanism 100 to form a fastener-cartridge assembly 266. As described above, mounting the temporary fastener 250 includes inserting the lower portion of the temporary fastener 250 in the inner cap bore 116 of the inner cap 112 such that the pin assembly 258 passes through the inner cap hole 120 formed in the floor 118 of the inner cap bore 116, and through the base plate hole 106 as shown in FIG. 23.

Referring to FIG. 42, step 506 of the method 500 includes positioning the fastener-cartridge assembly 266 against the structure 400 in a manner such that the pin assembly 258 of the temporary fastener 250 extends into a fastener hole 252 in the structure 400. In the example shown, the method 500 includes positioning the base plate 104 of the inner assembly 102 against the structure 400 such that the pin assembly 258 passes through the base plate hole 106 and enters the fastener hole 252. In the present disclosure, the temporary fastener 250 is a Cleco™ having a fastener head 254, a fastener body 256, and the pin assembly 258, as described above. In FIG. 42, the prongs 262 are shown extended such that the tangs 264 are past the end of the splay pin 260, causing the tangs 264 to come together, which reduces the width of the end of the pin assembly 258 to allow for insertion in the fastener hole 252. As shown in FIG. 42, a preliminary gap 280 exists between the structural components 402 of the structure 400 prior to tightening the Cleco™.

Referring to FIG. 43, with the pin assembly 258 installed in the fastener hole 252, the method 500 includes retracting the prongs 262 of the temporary fastener 250 (i.e., Cleco™) by rotating the fastener head 254. In the example shown, the fastener head 254 of the Cleco™ can be rotated using the fingers of a technician or with the aid of a tool such as a finger ratchet (not shown) or by using a powered device (e.g., a pneumatic nut driver, etc.). As the prongs 262 are retracted, the tangs 264 move back over the splay pin 260, causing the tangs 264 to spread apart, which locally increases the width of the end of the pin assembly 258. Further rotation of the fastener head 254 causes further retraction of the prongs 262 until the tangs 264 bear against the backside 406 of the structure 400 as shown. Although the method 500 is described using a Cleco™, other types of temporary fasteners 250 can be used, and which may have different pin assembly configurations than what is shown in the figures.

Referring still to FIG. 43, step 508 of the method 500 includes tightening the temporary fastener 250 until the displacement indicating system 160 indicates that the inner spring 126 and outer spring 170 haven been compressed by an amount representing attainment of a predetermined preliminary clamping force on the structure 400. In the example shown, step 508 comprises tightening the Cleco™ until visually observing the outer body upper edge 184 of the outer body 176 in the sight window 162 (i.e., the displacement indicating system 160). Tightening of the Cleco™ comprises rotating the fastener head 254 in a manner causing retraction of the prongs 262 of the pin assembly 258. The Cleco™ (i.e., temporary fastener 250) is tightened until the outer body upper edge 184 is visually observed as being aligned with an alignment feature (e.g., notches) extending from opposite sides of the sight window 162. The sight window 162 is axially longer than the alignment feature to allow for observation of the movement of the outer body upper edge 184 as it approaches the alignment feature. As shown in FIG. 43, the application of the preliminary clamping force on the structure 400 reduces the size of the gap between the structural components 402, relative to the size of the preliminary gap 280 in FIG. 42 in which the clamping force has not yet been applied to the structure 400.

Figure 45:
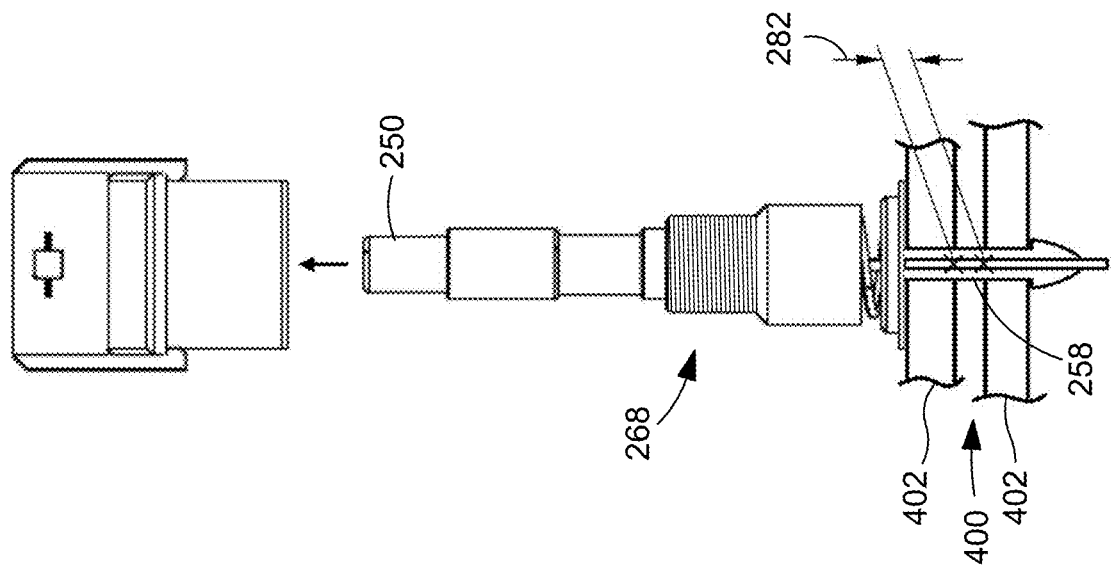
FIG. 45 shows the removal of the outer assembly from the inner assembly of a previously-installed temporary fastener.
Figure 44:
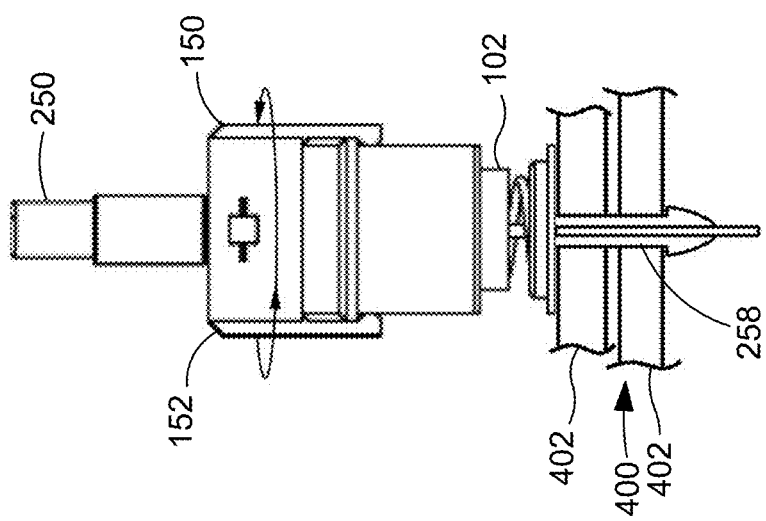
FIG. 44 shows the process of removing the outer assembly from the inner assembly to result in a fastener-inner assembly in which the temporary fastener exerts a final clamping force on the structure equal to approximately one-half the preliminary clamping force.

Referring to FIGS. 44-45, step 510 of the method 500 includes removing the outer assembly 150 from the inner assembly 102 to result in fastener-inner assembly 268 providing a final clamping force exerted by the temporary fastener 250 of approximately one-half the preliminary clamping force. The reduction in clamping force is due to the removal of the outer spring 170 from the fastener-inner assembly 268, which leaves only the inner spring 126 to apply a clamping force on the structure 400. In the example shown, removing the outer assembly 150 from the inner assembly 102 in step 510 comprises rotating the outer cap 152 to threadably disengage it from the inner cap 112. The reduction in clamping force due to removal of the outer assembly 150 from the inner assembly 102 results in a final gap 282 (FIG. 45) between the structural components 402 that is larger than the gap (FIG. 44) when the outer assembly 150 is coupled to the inner assembly 102. However, the final gap 282 in FIG. 45 is smaller than the preliminary gap 280 in FIG. 42 in which the clamping force has not yet been applied to the structure 400.

As described above, the magnitude of the final clamping force is predetermined by engineering as the amount required to clamp together the structural components 402 (i.e., layers) of the structure 400 without over-stressing the structure 400, yet the final clamping force is large enough to place the structural components 402 in a nominal state. Any gaps that occur between the structural components 402 in the nominal state (i.e., with final clamping force applied) are measured. Gaps that fall within allowable limits (e.g., 0.005 to 0.060 inch) are typically filled with shims, which are separately manufactured and permanently installed during the installation of permanent fasteners. Gaps that are smaller than the lower end (e.g., 0.005 inch) of the allowable limit may not require shimming, as any stresses generated after the installation of permanent fasteners are deemed to be negligible. Gaps that are larger that the upper end (e.g., 0.060 inch) of the allowable limit may necessitate reworking of the structure 400.

Referring to FIG. 46, after the outer assembly 150 has been removed from the inner assembly 102 of the most recently installed temporary fastener 250, the method 500 includes re-using the outer assembly 150 during the installation of other temporary fasteners 250 at one or more additional fastener holes 300 in the structure 400. The method 500 includes coupling the outer assembly 150 onto an additional inner assembly 304 similar to the above-described step 502. For example, in FIG. 46, the outer cap 152 of the outer assembly 150 is threadably engageable to the inner cap 112 of an additional inner assembly 304 to form another cartridge mechanism 100. After forming the cartridge mechanism 100, FIG. 46 shows the mounting of an additional temporary fastener 302 on the additional cartridge mechanism 100 to form an additional fastener-cartridge assembly 306 similar to the above-described step 504. The additional fastener-cartridge assembly 306 is then positioned against the structure 400 such that the pin assembly 258 of the additional temporary fastener 302 extends into an additional fastener hole 300 similar to the above-described step 506.

Once the additional fastener-cartridge assembly 306 is installed at the additional fastener hole 300, the method 500 includes tightening the additional temporary fastener 302 until the displacement indicating system 160 indicates attainment of the preliminary clamping force at the additional fastener hole 300, similar to the above-described step 508. The method 500 then includes removing the outer assembly 150 from the additional inner assembly 304 to result in an additional fastener-inner assembly 308 to result in a final clamping force exerted on the structure 400 by the additional temporary fastener 302 at the additional fastener hole 300, similar to the above-described step 510. The process is repeated for the installation of each additional temporary fastener 302.

As mentioned above, the method 500 avoids the need for a calibrated spring at each fastener installation, as required by conventional methods. Instead, the outer assembly 150 allows for re-use of a calibrated outer spring 170 at multiple fastener installations. By avoiding the need for a calibrated spring at each fastener installation, the method 500 allows for significant cost savings for manufacturing programs that require the installation of large quantities of temporary fasteners 250.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. An interim manufacturing assembly, comprising:
a structure containing a plurality of fastener holes;
a plurality of temporary fasteners installed in the fastener holes;
a plurality of inner assemblies upon which the plurality of temporary fasteners are respectively mounted, and each inner assembly is configured to be temporarily coupled to a reusable outer assembly of a cartridge mechanism during fastener installation;
wherein:
the inner assembly at each temporary fastener includes:
an inner cap on which the temporary fastener is mounted;
an inner spring located between the inner cap and the structure;
the outer assembly includes:
an outer cap removably couplable to the inner cap of each inner assembly;
an outer spring located between the outer cap and the structure when the outer assembly is coupled to one of the inner assemblies;
a displacement indicating system configured to indicate an amount of compressive displacement of the inner spring and outer spring that represents attainment of a desired preliminary clamping force exerted on the structure at each fastener hole due to tightening of the temporary fastener;
the inner spring of each inner assembly is uncalibrated and has a spring constant substantially equal to that of the outer spring, which is calibrated to one-half the preliminary clamping force at the amount of compressive displacement indicated by the displacement indicating system; and
the outer assembly of the cartridge mechanism is removable from each inner assembly and is reusable on other inner assemblies in a manner resulting in a final clamping force at each temporary fastener of approximately one-half the preliminary clamping force.

2. A cartridge mechanism for monitoring a clamping force exerted on a structure during installation of a temporary fastener, comprising:
an inner assembly, comprising:

an inner cap configured to receive a temporary fastener having a protruding pin assembly configured to be inserted into a fastener hole in a structure;

an inner spring positionable between the inner cap and the structure;

an outer assembly, comprising:

an outer cap removably couplable to the inner cap;

an outer spring positionable between the outer cap and the structure and encircling the inner spring;

a displacement indicating system integrated into the outer assembly and configured to indicate an amount of compressive displacement of the inner spring and outer spring that represents attainment of a desired preliminary clamping force exerted on the structure due to tightening of the temporary fastener;

wherein the inner spring is uncalibrated and has a spring constant substantially equal to that of the outer spring, which is calibrated to one-half the preliminary clamping force at the amount of compressive displacement indicated by the displacement indicating system; and the outer assembly is removable from the inner assembly to result in a final clamping force exerted by the temporary fastener on the structure of approximately one-half the preliminary clamping force.

3. The cartridge mechanism of claim 1, further including:

a retention system integrated into the outer assembly; and wherein the outer assembly includes an outer body, and the retention system is configured to retain the outer cap with the outer body when the outer spring is captured therebetween.

4. The cartridge mechanism of claim 2, wherein the outer cap is removably couplable to the inner cap via one of the following:

threaded engagement, snap-on/snap-off engagement, partial-turn interlock.

5. The cartridge mechanism of claim 2, wherein:

the inner cap has an inner cap bore configured to receive a lower portion of the temporary fastener; and the inner cap bore has a floor containing an inner cap hole configured to receive the pin assembly protruding from the temporary fastener.

6. The cartridge mechanism of claim 2, wherein:

the inner assembly includes a base plate configured to bear against the structure and which has a base plate hole configured to receive the pin assembly and allow its insertion into the fastener hole; and the inner spring is capturable between the inner cap and the base plate.

7. The cartridge mechanism of claim 2, wherein:

the outer assembly includes an outer body having an outer body upper edge;

the outer cap includes an outer cap wall configured to surround the outer body and move axially relative to the outer body as the inner spring and outer spring compress during tightening of the temporary fastener; and the displacement indicating system comprises a sight window formed in the outer cap wall at an axial location where the outer body upper edge becomes visible in the sight window when the inner spring and outer spring have been compressed by the amount representing the desired preliminary clamping force.

8. The cartridge mechanism of claim 7, wherein:

the sight window has at least one alignment feature located on a side of the sight window;

the sight window is axially longer than the alignment feature to allow for visual observation of movement of the outer body upper edge as it approaches the alignment feature during tightening of the temporary fastener; and the alignment feature is at the axial location where visibility of the outer body upper edge represents attainment of the preliminary clamping force.

9. The cartridge mechanism of claim 2, wherein:

the outer assembly includes an outer body configured to surround the inner assembly;

the outer body has an internally-located spring support; and the outer spring is capturable between the spring support and the outer cap.

10. The cartridge mechanism of claim 9, wherein:

the outer body has an outer body intermediate portion containing internal threads;

the spring support comprises a cylindrical spring setter having external threads configured to engage with the internal threads of the outer body intermediate portion; and wherein, prior to mating the outer assembly to the inner assembly, the spring setter is rotatable in a manner adjusting an axial position of the spring setter within the outer body as a means to adjust a preload on the outer spring for recalibration to one-half the desired preliminary clamping force when the inner spring and outer spring have been compressed by the amount representing the desired preliminary clamping force.

11. The cartridge mechanism of claim 10, wherein the spring setter includes:

one or more mechanical features formed on an inner surface of the spring setter and configured to be engaged by complementary mechanical features formed on an exterior surface of a spring setter tool configured for rotating the spring setter.

12. A method of monitoring a clamping force exerted on a structure during installation of a temporary fastener, comprising:

providing a cartridge mechanism, comprising:

an inner assembly having an inner cap and an inner spring positionable between the inner cap and the structure;

an outer assembly having an outer cap removably coupled to the inner cap, and having an outer spring positionable between the outer cap and the structure and encircling the inner spring;

a displacement indicating system integrated into the outer assembly;

wherein the inner spring is uncalibrated and has a spring constant substantially equal to that of the outer spring, which is calibrated to one-half of a desired preliminary clamping force exerted on the structure at a compressive displacement indicated by the displacement indicating system;

mounting a temporary fastener on the inner cap to form a fastener-cartridge assembly;

positioning the fastener-cartridge assembly against the structure in a manner such that a pin assembly protruding from the temporary fastener extends into a fastener hole in the structure;

tightening the temporary fastener until the displacement indicating system indicates that the inner spring and outer spring haven been compressed by an amount representing attainment of a predetermined preliminary clamping force on the structure; and removing the outer assembly from the inner assembly to result in fastener-inner assembly providing a final clamping force exerted on the structure by the temporary fastener of approximately one-half the preliminary clamping force.

13. The method of claim 12, wherein after removing the outer assembly from the inner assembly, the method comprises performing the following at one or more additional fastener holes in the structure:
 coupling the outer assembly to an additional inner assembly;
 coupling an additional temporary fastener to the inner cap of the additional inner assembly to form an additional fastener-cartridge assembly;
 positioning the additional fastener-cartridge assembly against the structure at an additional fastener hole;
 tightening the additional temporary fastener until the displacement indicating system indicates attainment of the preliminary clamping force at the additional fastener hole; and
 removing the outer assembly from the additional inner assembly to result in an additional fastener-inner assembly providing a final clamping force exerted by the additional temporary fastener at the additional fastener hole.

14. The method of claim 12, further including:
 retaining the outer cap with an outer body using a retention system integrated into the outer assembly.

15. The method of claim 12, wherein the outer cap is removably coupled to the inner cap via one of the following:
 threaded engagement, snap-on/snap-off engagement, partial-turn interlock.

16. The method of claim 12, wherein tightening the temporary fastener comprises:
 rotating a fastener head of the temporary fastener in a manner causing retraction of a pair of prongs of the pin assembly until a pair of tangs clamp up against a backside of the structure and apply the preliminary clamping force.

17. The method of claim 12, wherein tightening the temporary fastener until the displacement indicating system indicates compression of the inner spring and outer spring comprises:
 tightening the temporary fastener until visually observing an upper edge of an outer body of the outer assembly in a sight window formed in an outer cap wall of the outer cap; and
 wherein the outer cap wall surrounds the outer body and moves axially relative to the outer body as the inner spring and outer spring compress during tightening of the temporary fastener.

18. The method of claim 17, wherein tightening the temporary fastener until visually observing the upper edge of the outer body in the sight window comprises:
 tightening the temporary fastener until visually observing the upper edge of the outer body in an alignment feature extending from a side of the sight window; and
 wherein the sight window is axially longer than the alignment feature to allow for visual observation of movement of the outer body upper edge as it approaches the alignment feature.

19. The method of claim 12, wherein the step of providing the cartridge mechanism includes recalibrating the outer spring prior to mating the outer assembly to the inner assembly, by performing the following:
 installing a cylindrical spring setter in a cylindrical outer body of the outer assembly by engaging external threads of the spring setter with internal threads of an outer body intermediate portion to thereby form a setter-body subassembly;
 assembling the setter-body subassembly with the outer spring and the outer cap to thereby form the outer assembly; and
 adjusting an axial position of the spring setter within the outer body by rotating the spring setter until the outer spring is recalibrated to one-half the desired preliminary clamping force when the outer spring is compressed by the amount indicated by the displacement indicating system.

20. The method of claim 19, wherein adjusting the axial position of the spring setter comprises:
 inserting a tool portion of a thumbscrew into the spring setter to engage one or more mechanical features formed on an inner surface of the spring setter with matching mechanical features formed on an exterior surface of the tool portion; and
 manually rotating the thumbscrew to rotate the spring setter.

\* \* \* \* \*